United States Patent [19]

Tsuboi et al.

[11] Patent Number: 5,119,182
[45] Date of Patent: Jun. 2, 1992

[54] IMAGE FORMING APPARATUS COMPRISING SAMPLE IMAGE PRINTING MODE AND IMAGE FORMING METHOD THEREFOR

[75] Inventors: Toshio Tsuboi; Keiji Nakatani; Shigeru Moriya, all of Osaka, Japan

[73] Assignee: Minolta Camera Kabushiki Kaisha, Osaka, Japan

[21] Appl. No.: 482,897

[22] Filed: Feb. 22, 1990

[30] Foreign Application Priority Data

Feb. 23, 1989 [JP] Japan .................. 1-44135
Feb. 23, 1989 [JP] Japan .................. 1-44136
Feb. 23, 1989 [JP] Japan .................. 1-44137

[51] Int. Cl.$^5$ .............................................. H04N 1/40
[52] U.S. Cl. ...................................................... 358/75
[58] Field of Search ............... 358/401, 451, 449, 450, 358/452, 453, 75, 80

[56] References Cited

U.S. PATENT DOCUMENTS

| | | | |
|---|---|---|---|
| 4,275,958 | 6/1981 | Tachika et al. | 355/14 R |
| 4,387,297 | 6/1983 | Swartz et al. | 235/462 |
| 4,603,262 | 7/1986 | Eastman et al. | 250/566 |
| 4,674,861 | 6/1987 | Kawamura | 355/4 |
| 4,755,852 | 7/1988 | Fujita | 355/14 E |
| 4,794,419 | 12/1988 | Shibazaki et al. | 355/3 R |
| 4,825,246 | 4/1989 | Fukuchi et al. | 355/4 |
| 4,875,173 | 10/1989 | Nakajima | 364/518 |
| 4,876,571 | 10/1989 | Nakamura et al. | 355/210 |
| 4,893,194 | 1/1990 | Sakata | 358/451 |
| 4,899,277 | 2/1990 | Yamada | 358/451 |
| 4,947,269 | 8/1990 | Yamada | 358/451 |

FOREIGN PATENT DOCUMENTS

| | | |
|---|---|---|
| 49-131317 | 12/1974 | Japan . |
| 54-104834 | 8/1979 | Japan . |
| 55-123270 | 9/1980 | Japan . |
| 56-83757 | 8/1981 | Japan . |
| 57-61372 | 4/1982 | Japan . |
| 60-216670 | 10/1985 | Japan . |
| 60-239764 | 11/1985 | Japan . |
| 63-14177 | 1/1988 | Japan . |
| 1-126074 | 5/1989 | Japan . |

Primary Examiner—Stephen Brinich
Attorney, Agent, or Firm—Burns, Doane, Swecker & Mathis

[57] ABSTRACT

There are disclosed an image forming apparatus such as a digital copying machine and an image forming method. In the image forming apparatus and method, there are transformed supplied reference color image data into plural sample image data having color tones stepwisely different from each other by multiplying the reference color image data one by one by supplied plural color adjustment coefficients, and then, there are recorded plural sample images corresponding to the plural sample image data on a piece of recording paper. When the operator selects one of the plural sample images, a controller alters the supplied reference color image data into another reference color image data responsive to color adjustment coefficients of the selected one of the plural sample images.

35 Claims, 16 Drawing Sheets

IMAGE FORMING APPARATUS COMPRISING SAMPLE IMAGE PRINTING MODE AND IMAGE FORMING METHOD THEREFOR

BACKGROUND OF THE INVENTION

1. Field of the Invention

The present invention relates to an image forming apparatus and an image forming method therefor, and more particularly, to an image forming apparatus comprising a sample image printing mode for printing plural sample images having different color balances on a piece of printing paper, such as a digital copying machine comprising a mosaic monitor mode, and also an image forming method therefor.

2. Description of the Related Art

A conventional digital color copying machine comprises a reading section for reading an image of a document by using a color image sensor and converting the image of the document into image data for printing, and an electrophotographic printer section for printing an image of the document on a copying paper according to the image data. In the case that plural color images are to be superimposed on a copying paper, the document is read out repeatedly by the reading section, and each color image is printed on the same copying paper by the printer section in the order of respective colors predetermined.

The reading section comprises a masking circuit for generating a color-corrected signal corresponding to printing characteristics of the printer section. Generally speaking, it is difficult for the masking process circuit to minimize the color difference between the real document and the copy thereof with respect to all the colors contained therein. Therefore, in such a case that a copy is further copied as a document, the color tone of the secondary copy may be considerably different from that of the original document. However, in the range of a limited color tone, if a better color balance adjustment is performed, the variation of the color tone can be minimized.

Conventionally, the color balance adjustment is performed by referring to a copy obtained in a certain color balance in a manner of so-called cut and try. In this case, the scanning operation of the document is repeated by a number of times which is a product of a number of times of the color balance operation needed for obtaining a desired color copy and a number of the printing colors, and therefore, the color balance operation is time consuming and laborious.

Generally, in the conventional digital color copying machine, in order to adjust a color balance upon making a color adjustment, for example, there are set respective color adjustment coefficients of cyan color, magenta color and yellow color. Namely, the above color adjustment coefficients are normally set at predetermined standard levels, respectively, and when a color balance of an image to be printed on a copying paper is altered, respective color adjustment coefficients are set at proper levels, respectively.

The inventors of the present invention have proposed a color adjustment selecting method (referred to as a mosaic monitor method hereinafter) for decreasing time and cost required for the color correction in the U.S. patent application Ser. No. 321,405 as filed on Mar. 10, 1989. In this mosaic monitor method, a part of a document (referred to as a specific area hereinafter) including a partial image for example a face of a person, for which the operator makes the color reproduction much particularly, is set by a specific area setting means, and then, image data of the specific area is stored in an image memory means. Next, the color adjustment is made for the image data read out from the image memory means with predetermined various color adjustment coefficients, and then, those image data are printed at different positions of the same copying paper in a mosaic-like pattern. Thereafter, the operator selects an image having a color balance nearest to that of a document or an image having a color balance most desirable for the operator among plural images of the specific area (referred to as mosaic monitor images hereinafter) which have been reproduced with different color balances, respectively. Thereafter, a copy of the whole area of document is produced based on the color adjustment coefficients of the mosaic monitor image selected. Thus, a copy of document having the most desirable color balance can be obtained easily.

In this digital color copying machine using the mosaic monitor method, different plural levels of each of the color adjustment coefficients $y_i$, $m_i$ and $c_i$ ($i = 1, 2, 3, \ldots$) are set previously, and the color adjustment is made for an image of a partial specific area repeatedly under the condition of plural color balances which have different combinations ($y_i$, $m_j$ and $c_k$) of respective set color adjustment coefficients, respectively. Thereafter, the mosaic monitor images comprised of plural test images having different plural color balances is printed on a copying paper, and the operator selects an image having the most desirable color balance among the mosaic monitor images. Thus, it becomes easy for the operator to select an image having the most desirable color balance.

However, for example, if there is no image having a desirable color balance among the mosaic monitor images for the operator, it is necessary for the operator to repeat the above mosaic monitor operation altering the color adjustment coefficients until a mosaic monitor image having a desirable color balance can be obtained. In this case, it is necessary to repeat a scan operation for a specified area of the document image again. Particularly, in the case that the operator wishes to faithfully reproduce an image having a partial image having a skin color such as a portrait, it is often necessary to repeat the color adjustment many times. Therefore, it has been desirable that the color adjustment can be made more efficiently.

Further, in the conventional digital color copying machine, there is often caused a change in the color tone which has been set as the time goes. Therefore, proper color adjustment coefficients may change due to this change. It is desirable that the operator can alter the changed color adjustment coefficients into predetermined proper ones easily.

Furthermore, in the conventional digital color copying machine, the color adjustment coefficients of respective colors can be adjusted, for example, in eleven steps, upon the color adjustment. On the other hand, in the aforementioned mosaic monitor mode, the color adjustment coefficients are relatively roughly changed in several steps in the range of the same color adjustment, for example, in three steps among eleven steps of the same color adjustment, and several mosaic monitor images of a specified area of a document image are printed on a piece of copying paper. Therefore, in the mosaic monitor mode, when the operator selects an image having a desirable color balance among the printed several mosaic monitor images, he can make a more fine color adjustment so as to set a color adjustment coefficient between the adjacent levels thereof which can be set based on the color balance having the selected image among the mosaic monitor images in the mosaic monitor mode, after making the digital color copying machine go back to the next normal mode.

However, in the case of further fine adjusting the color adjustment coefficients which have been selected in the mosaic monitor mode, it is necessary to make the fine color adjustment in a manner of so-called cut and try by more fine adjusting the color adjustment coefficients and performing the copying operation every fine adjustment, after finishing the mosaic monitor mode. Therefore, the above complicated operation is required, and also it takes a long time to more finely adjust the color adjustment coefficients. It is desirable that the color adjustment coefficients can be more finely adjusted in the mosaic monitor mode.

Furthermore, since the operator can not easily grasp a relationship between the color adjustment coefficients and the fine adjustment in the mosaic monitor mode, it is difficult to make the fine color adjustment. If the operator easily grasps this relationship, he can more easily make the fine color adjustment.

Furthermore, in the case of printing the mosaic monitor images in the mosaic monitor mode, a mosaic monitor selection key is pressed, and then, the printing conditions for printing the mosaic monitor images. Thereafter, the printing operation is performed under the printing conditions which have been set by the operator, such as a printing magnification, a size of copying paper, a number of prints. It is to be noted that, since a density different from a predetermined standard value influences the color balance upon printing the mosaic monitor images, the density is reset to the predetermined standard value, and the mosaic monitor images are printed on a piece of copying paper.

However, even though the density is set at the standard value, the operator may set a wrong printing condition upon printing the mosaic monitor image, and also, unsuitable setting values which have been set previously may be used continuously, where that the operator has forgot to set new setting values.

Furthermore, if an all reset key of the digital color copying machine is pressed upon setting the printing conditions, the printing conditions such as a size of copying paper may not always set for suitable printing conditions. In this case, if the set printing magnification is different from the reading magnification for a specified area of a document image, the quality of the printed mosaic monitor images may be different from that of the original image. Further, if the size of the copying paper to be printed is smaller than a size of the printing format of the mosaic monitor images, all the mosaic monitor images may not be printed on the copying paper. Furthermore, if the number of prints which has been set previously is smaller than a number of prints required for printing the mosaic monitor images, all the required copies of mosaic monitor images can not printed on the copying paper. Therefore, if trouble has developed, it is necessary for the operator to select the mosaic monitor mode again, and print the mosaic monitor images on a piece of copying paper. Thus, the operator may waste a time and many pieces of copying papers.

SUMMARY OF THE INVENTION

An essential object of the present invention is to provide an image forming apparatus and/or method comprising a sample image printing mode for forming plural sample images having different color balances on a piece of printing paper, which is capable of adjusting a printing color balance into a desirable one more quickly.

Another object of the present invention is to provide an image forming apparatus and/or method comprising a sample image printing mode for forming plural sample images having different color balances on a piece of printing paper, which is capable of more finely adjusting a printing color balance more easily.

A further object of the present invention is to provide an image forming apparatus and/or method comprising a sample image printing mode for forming plural sample images having different color balances on a piece of printing paper, which is capable of being prevented from printing plural sample images on printing paper under any wrong printing conditions.

In order to accomplish the above objects, according to one aspect of the present invention, there is provided an image forming apparatus comprising:

image data supply means for supplying reference color image data;

adjustment coefficient supply means for supplying plural different color adjustment coefficients;

processing means for transforming said reference color image data into plural sample image data having color tones stepwisely different from each other by multiplying said reference color image data one by one by said plural color adjustment coefficients;

recording means for recording plural sample images corresponding to said plural sample image data on a piece of recording paper;

selection means for selecting one of said plural sample images; and control means for altering said reference color image data supplied by said image data supply means into another reference color image data responsive to color adjustment coefficients of one of said plural sample images selected by said selection means.

According to another aspect of the present invention, there is provided an image forming apparatus comprising:

image data supply means for supplying reference color image data;

adjustment coefficient supply means for supplying plural different color adjustment coefficients;

automatic processing means for transforming said reference color image data into plural sample image data having color tones stepwisely different from each other by multiplying said reference color image data one by one by said plural color adjustment coefficients;

recording means for recording plural sample images corresponding to said plural sample image data on a piece of recording paper;

selection means for selecting one of said plural sample images;

manual processing means for fine adjusting said color adjustment coefficients of one of said plural sample images selected by said selection means by manual operation; and control means for altering said reference color image data supplied by said image data supply means into another reference color image data responsive to said color adjustment coefficients fine adjusted by said manual processing means.

According to a still further aspect of the present invention, there is provided an image forming apparatus comprising:

image forming means for forming an image on a piece of recording paper under one of plural selectable image forming conditions, said image forming means being operable in a document image recording mode for forming a document image on a piece of recording paper, and a sample image recording mode for forming a sample image on a piece of recording paper;

first selection means for selecting a desirable one of said plural image forming conditions;

second selection means for selecting either said document image recording mode or said sample image recording mode; and control means for enabling said image forming means under a predetermined image forming condition independent of one of said plural image forming conditions selected by said first selection means when said sample image recording mode is selected by said second selection means.

According to a still further aspect of the present invention, in an image forming apparatus for forming sample images on a piece of recording paper, there is provided an image forming method including steps of:

supplying reference color image data;

supplying plural different color adjustment coefficients;

transforming said reference color image data into plural sample image data having color tones stepwisely different from each other by multiplying said reference color image data one by one by said plural color adjustment coefficients;

recording plural sample images corresponding to said plural sample image data on a piece of recording paper;

selecting one of said plural sample images; and altering said supplied reference color image data into another reference color image data responsive to color adjustment coefficients of said selected one of said plural sample images.

According to a still more further aspect of the present invention, in an image forming apparatus for forming sample images on a piece of recording paper, there is provided an image forming method including steps of:

supplying reference color image data;

supplying plural different color adjustment coefficients;

transforming said reference color image data into plural sample image data having color tones stepwisely different from each other by multiplying said reference color image data one by one by said plural color adjustment coefficients;

recording plural sample images corresponding to said plural sample image data on a piece of recording paper;

selecting one of said plural sample images;

fine adjusting said color adjustment coefficients of said selected one of said plural sample images; and altering said supplied reference color image data into another reference color image data responsive to said fine adjusted color adjustment coefficients.

According to another aspect of the present invention, in an image forming apparatus for forming an image on a piece of recording paper under one of plural selectable image forming conditions, said image forming apparatus being operable in a document image recording mode for forming a document image on a piece of recording paper, and a sample image recording mode for forming plural sample images having different color balances on a piece of recording paper; there is provided an image forming method including steps of:

selecting said sample image recording mode;

setting a predetermined image forming condition when said sample image recording mode is selected; and forming said plural sample images on a piece of recording paper under said set predetermined image forming condition in said sample image recording mode.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
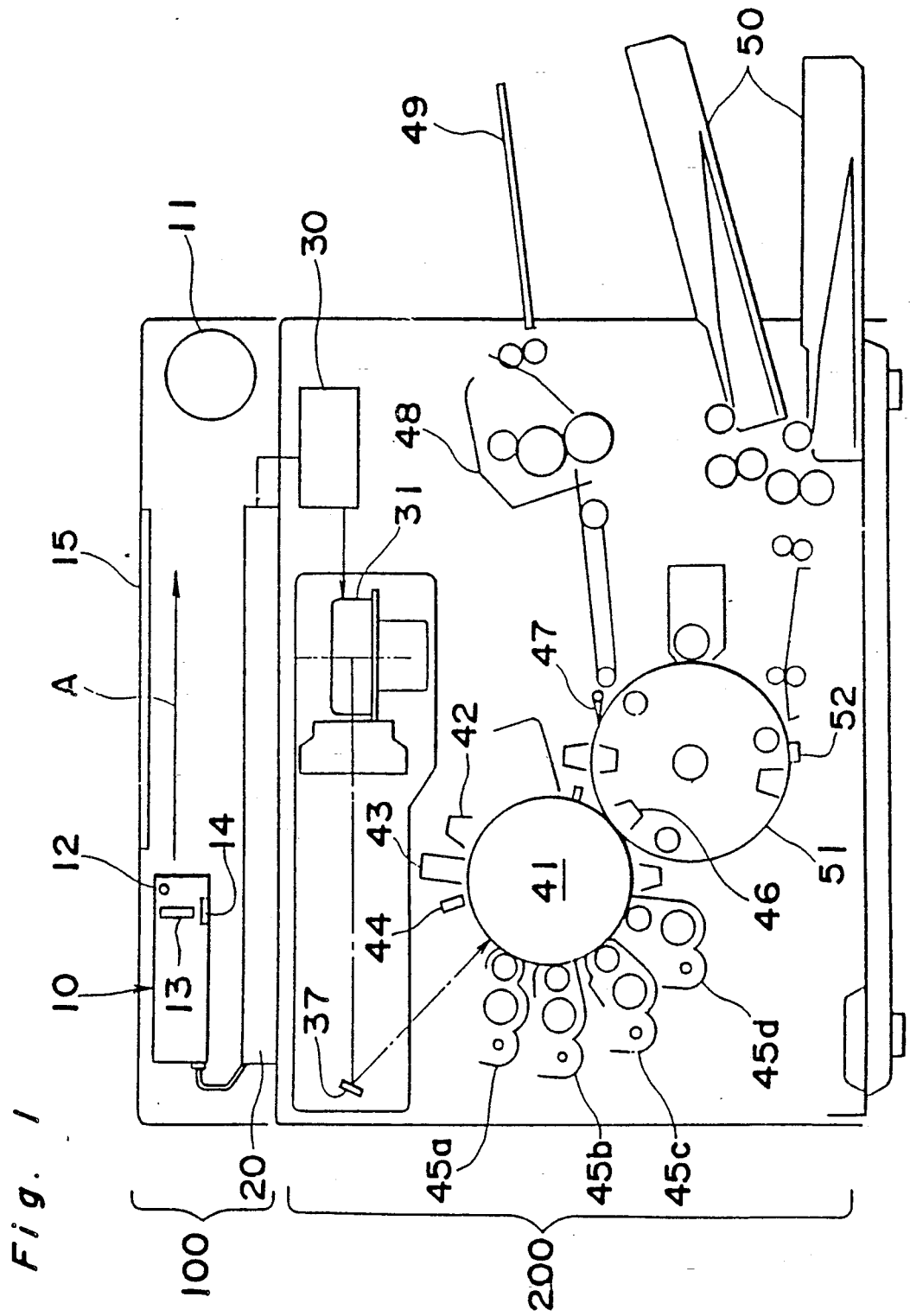
FIG. 1 is a schematic cross sectional view showing a digital color copying machine of a preferred embodiment according to the present invention.

Preferred embodiments according to the present invention will be described below with reference to the attached drawings.

First preferred embodiment

A digital color copying machine of a first preferred embodiment according to the present invention will be described below in the order of the following items.
(1) Composition of the digital color copying machine
(2) Action of mosaic monitor and color adjustment function
(3) Color tone setting circuit
(4) Image memory circuit
(5) Control flow in the mosaic monitor mode
 (5-1) Main routine
 (5-2) Image register process
 (5-3) Mosaic monitor image printing process
 (5-4) Interruption process for setting Color adjustment coefficients The present invention particularly relates to the description of the above paragraphs (2), (3) and (5).

(1) Composition of the digital color copying machine

A digital color copying machine of the first preferred embodiment according to the present invention comprises a reading section 100 for reading an image of a document using an image sensor and converting the image of the document into image data, and a printer section 200 for printing the image corresponding to the image data on a copying paper using the electrophotographic process.

In the copy machine, a multi-color copy is obtained by repeating an image reading process by the image reading section 100 and an image forming process by the printer section 200 with respect to each of printing colors. That is, the reading section 100 reads the image of the document corresponding to respective colors of yellow, magenta and cyan, respectively, and outputs respective color image data to the printer section 200. The printer section 200 forms respective color images according to respective color image data outputted from the reading section 100. Thus, respective color images are superimposed on a copying paper so as to form a color image.

FIG. 1 shows the whole composition of the digital color copying machine of the first preferred embodiment according to the present invention.

Referring to FIG. 1, a scanner 10 comprises an exposure lamp 12 for illuminating the document, a rod lens array 13 for condensing the light reflected from the document, and a CCD color image sensor 14 for converting the condensed light into an electrical signal. The scanner 10 is moved in a direction indicated by an arrow A by a motor 11 upon reading the document so as to scan the document set on a platen 15. The image of the document illuminated by a light source is converted into multi-level analogue electric signals of red color, green color and blue color by the CCD color image sensor 14.

The analogue electric signals outputted from the CCD color image sensor 14 are converted into binary image data corresponding to each of an yellow color image, a magenta color image and a cyan color image of the document, and individual color image data are stored in a buffer memory 30.

Figure 2:
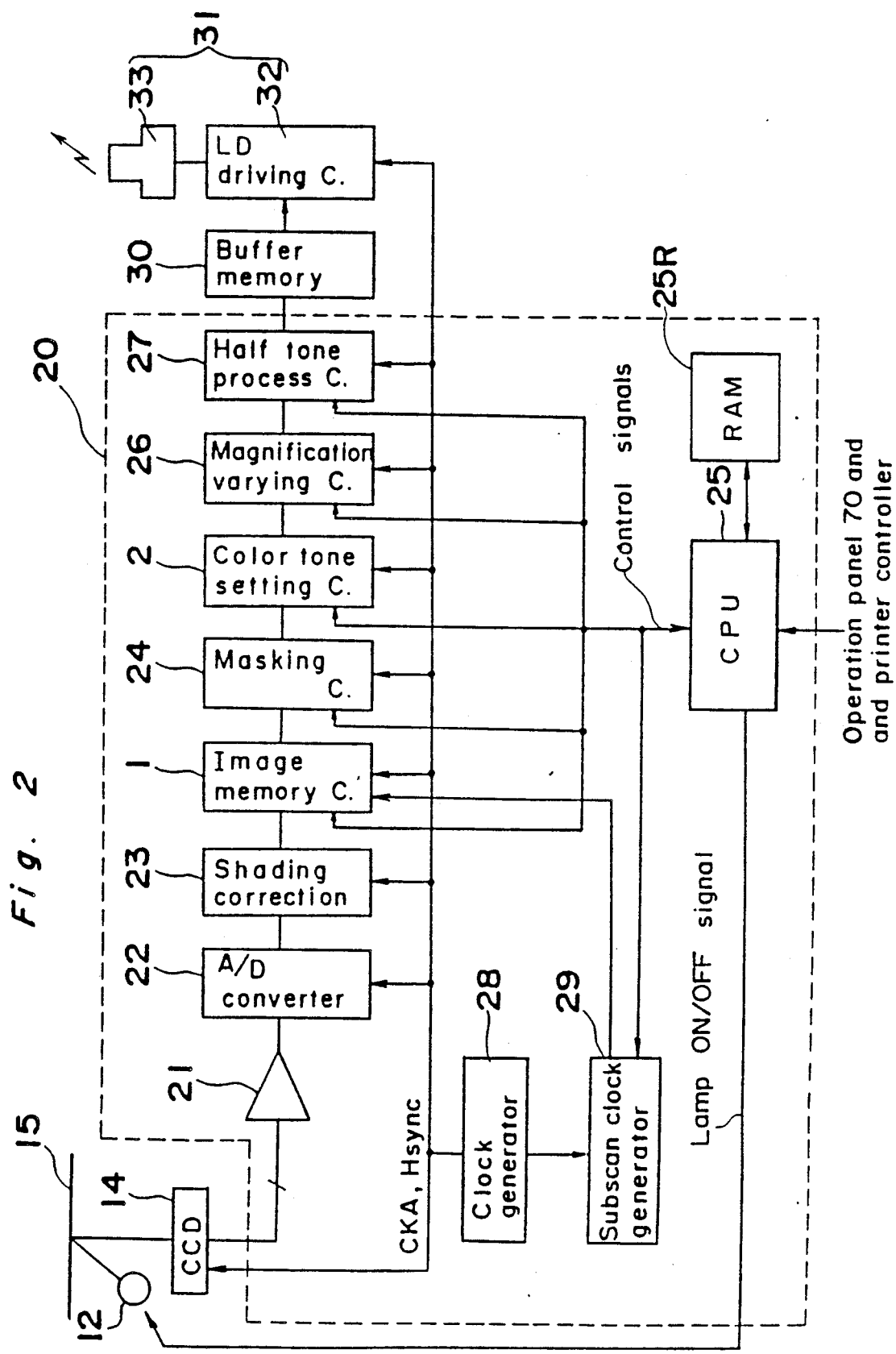
FIG. 2 is a schematic block diagram showing a signal processing section shown in FIG. 1.

Referring to FIG. 2, a print head 31 comprises of an LD driving circuit 32 and a semiconductor laser (LD) 33. The LD driving circuit 32 drives the semiconductor laser 33 according to the image data read out from the buffer memory 30.

Referring back to FIG. 1, a laser beam generated from the semiconductor laser 33 is swept in the axial direction of a photoconductive drum 41 by an optical means (not shown) such as a polygon mirror, and is projected onto the surface of the rotating photoconductive drum 41 through a reflection mirror 37. Then, the image of the document is formed on the surface of the photoconductive drum 41. Before the photoconductive drum 41 is projected by the above laser beam, it is illuminated by an eraser lamp 42, is electrified by a corona charger 43, and furthermore, is illuminated by an eraser lamp 44. Thereafter, the above laser beam is projected onto the surface of the photoconductive drum 41 so as to form an electrostatic latent image thereon. After either one of an yellow color toner developing unit 45a, a magenta color toner developing unit 45b, a cyan color toner developing unit 45c and a black color toner developing unit 45d is activated, the electrostatic latent image formed on the surface of the photoconductive drum 41 is developed into a visible toner image. The developed visible toner image is transferred onto a copying paper which is wound around a transfer drum 51.

The image forming process is repeated with respect to four colors (yellow, magenta, cyan and black) so as to form a color image on a copying paper wound around the transfer drum 51. The scanner 10 is driven in synchronism with the rotations of the photoconductive drum 41 and the transfer drum 51 in the image forming process. Thereafter, a separating nail member 47 is enabled so that the copying paper is separated from the transfer drum 41, and thereafter, the copying paper is fixed by a fixing unit 48 and is discharged to a paper discharging tray 49.

It is to be noted that the copying paper is fed from a paper cassette 50, and the edge of the copying paper is chucked by a chucking mechanism 52 which is arranged around the transfer drum 51 so as to prevent an image from being shifted upon transferring the toner image thereon.

FIG. 2 shows a signal processing section 20 for processing the analogue electric signals outputted from the CCD color image sensor 14 so as to output the binary image signals corresponding to the electric signals.

Referring to FIG. 2, in the normal image forming process, the analogue image signals outputted from the CCD color image sensor 14 are converted into electric signals corresponding to the density of the image by a logarithmic amplifier 21, and the electric signal outputted from the amplifier 21 is converted into multi-level digital data by an analogue to digital converter (referred to as an A/D converter hereinafter) 22. A shading correction is performed with respect to individual image data of red color, green color and blue color by a shading correction circuit 23. In a mosaic monitor mode (MMM) as described later, the image data outputted from the shading correction circuit 23 is stored in an image memory circuit 1. On the other hand, in a normal print mode for forming a normal color image on a copying paper, the image memory circuit 1 is disabled, and the image data outputted from the shading correction circuit 23 is directly to a masking circuit 24.

Respective image data of red color, green color and blue color are processed in parallel in the above data processing. Thereafter, the masking circuit 24 generates image data of one printing color of yellow color, magenta color, cyan color and black color from the image data of red color, green color and blue color according to the characteristics of the printing toner designated, wherein the printing color is determined in response to a control signal input from a CPU 25.

The masking circuit 24 comprises a back ground color rejecting circuit for rejecting color data on a back ground surface of the image to be processed, and a black color data generating circuit for generating black color data upon scanning black color image.

In the case that the color balance is to be altered in the mosaic monitor mode and the normal print mode, the color tone setting circuit 2 performs the color correction for the image data outputted from the masking circuit 24, and outputs the corrected image data to a magnification varying circuit 26. On the other hand, in the case that the color balance is kept unchanged, the color tone setting circuit 2 is disabled, and therefore, the color correction is not performed. Then, the image data outputted from the masking circuit 24 is directly sent to the magnification varying circuit 26.

The magnification varying circuit 26 electrically processes the image data outputted from the masking circuit 24 or the color tone setting circuit 2 so as to vary the magnification of the image in the main scan direction by a well known manner, and output the generated image data to a half tone processing circuit 27. On the other hand, the magnification in the subscan direction is varied by varying the velocity of the scanner 10 for scanning the document.

The half tone processing circuit 27 binarizes the image data outputted from the magnification varying circuit 26 so as to generate the binary pseudo half tone signals and store them in the buffer memory 30. The LD driving circuit 32 drives the semiconductor laser 33 so as to generate a laser beam according to the pseudo half tone signals outputted from the buffer memory 30.

On the other hand, a clock generator 28 generates a horizontal synchronizing signal Hsync and a clock signal CKA for synchronizing the reading action of the CCD color image sensor 14 with the image data processing of respective circuits of the signal processing section 20. Furthermore, a subscan clock generator 29 for varying the magnification generates a subscan clock for varying the magnification which is an interruption signal for outputting to the image memory circuit 1 in accordance with a control signal outputted from the CPU 25.

Figure 4:
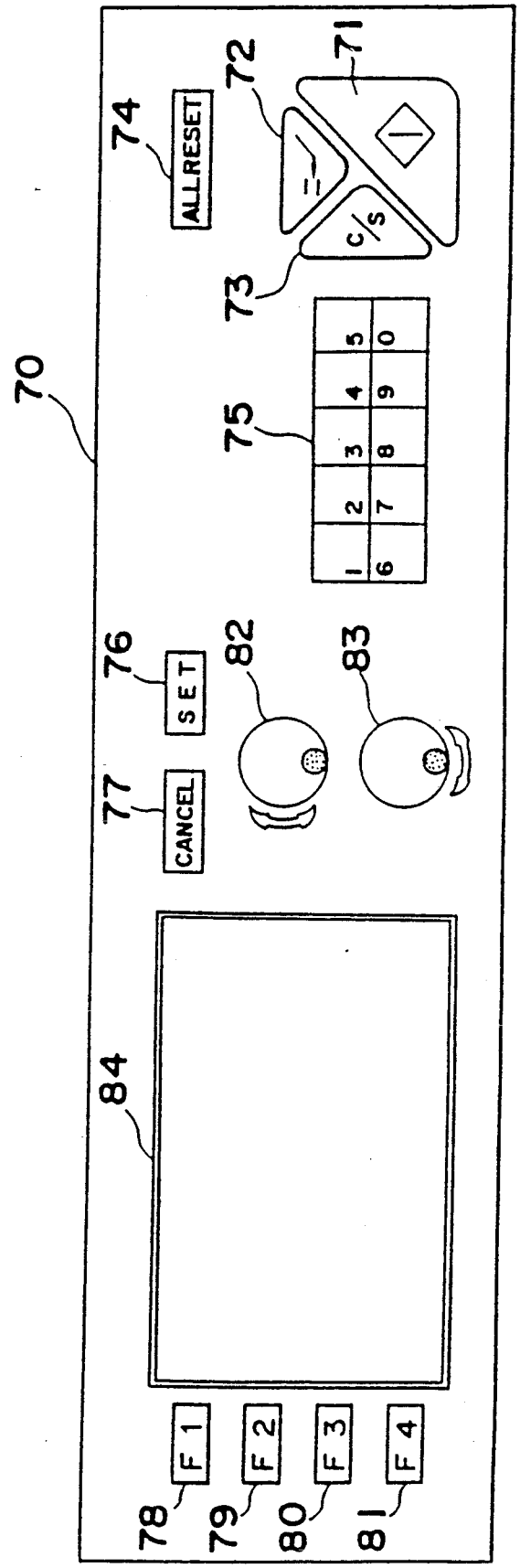
FIG. 4 is a top plan view showing an operation panel of the digital color copying machine shown in FIG. 1.

The CPU 25 communicates with not only an operation panel 70 shown in FIG. 4 but also a printer controller (not shown). Since respective operations of a communication between the CPU 25 and the operation panel 70 and a communication between the CPU 25 and the printer controller are similar to those of a conventional copying machine, the description thereof is omitted in the specification.

Figure 3:
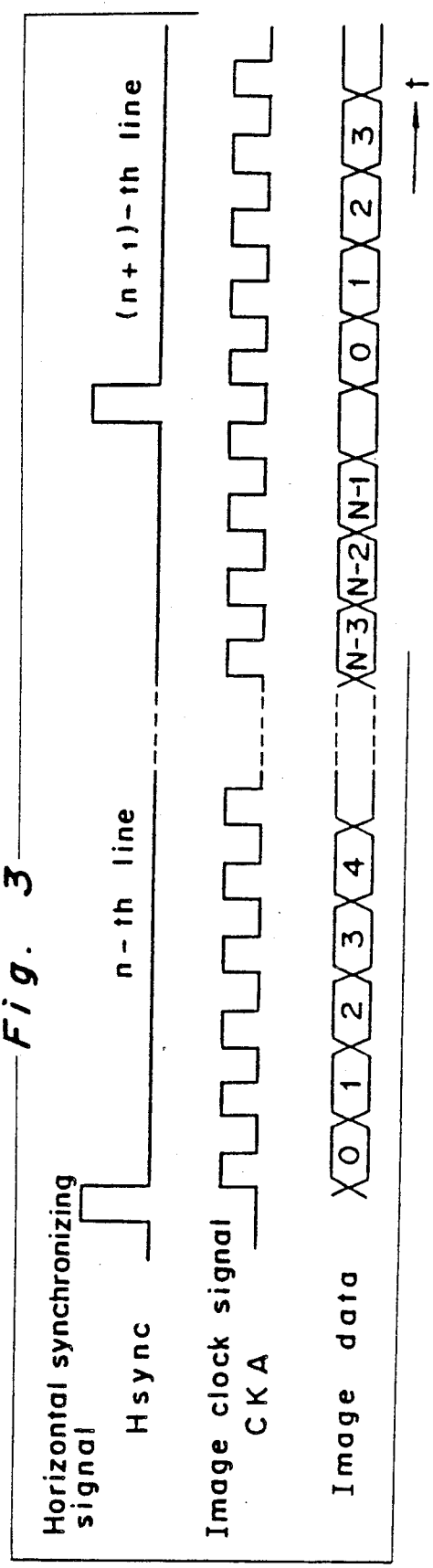
FIG. 3 is a timing chart showing an action of the signal processing section shown in FIG. 2.

FIG. 3 is a timing chart of the image data which is processed in the signal processing section 20.

Referring to FIG. 3, the horizontal synchronizing signal Hsync and the clock signal CKA are generated by the clock generator 28, and the CCD color image sensor 14 outputs the image data of red color, green color and blue color in serially in synchronism with the clock signal CKA. In FIG. 3, the numerals indicated in the individual image data denote addresses in the main scan direction. Every time the horizontal synchronizing signal Hsync is generated, the line n in the main scan direction is renewed. Then, the scanner 10 is moved in the subscan direction by a unit distance.

The digital color copying machine of the present preferred embodiment comprises a color correction function which is performed in the mosaic monitor mode, and a superimposing function for superimposing one image on another image. In order to perform the above functions, a memory for storing image data is required. Since there are a number of image processing common to both the above functions, both of the image memory circuit 1 for storing image data and the color tone setting circuit 2 are used and are controlled by the CPU 25 upon performing the above functions. It is to be noted that the detailed description of the superimposing function is omitted therein since the superimposing function is disclosed in the other U.S. applications filed by the present applicant and is well known to those skilled in the art.

FIG. 4 shows the operation panel 70 arranged on the main body of the copying machine.

Referring to FIG. 4, on the operation panel 70, there are arranged a print start key 71 for starting the copying operation, an interruption key 72 for instructing an interruption copying operation, a clear stop key 73, an all reset key 74, a set of ten keys 75, a set key 76, a cancel key 77, various kinds of function keys 78 to 81, jog dials 82 and 83 for setting the areas which are described later, a liquid crystal display section 84 for displaying the image of the document so as to set the above areas and displaying a state of a color balance selected as described later and various kinds of messages. The function keys 78, 79, 80 and 81 are a selecting key for selecting the mosaic monitor mode, a selecting key for selecting a superimposing mode, a density correction key, and a magnification setting key, respectively.

Figure 5:
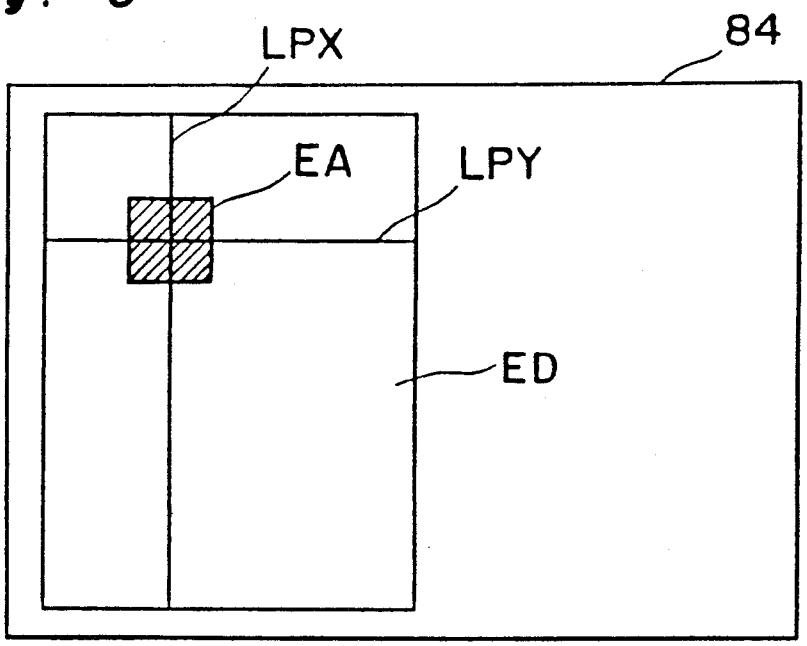
FIG. 5 is a front view showing a display section of the operation panel shown in FIG. 4 upon setting a specific area thereon.

In the mosaic monitor mode described later in detail, the areas such as specific area etc. are set as follows. For example, in the case of setting the specific area, as shown in FIG. 5, a document is set on the platen 15, and a preparatory scan is performed by the scanner 10, and then, the image of the document is roughly displayed on the document area ED of the display section 84 of the operation panel 70. As shown in FIG. 5, the intersection between a longitudinal instructing line LPX and a lateral instructing line LPY corresponds to the center of the square specific area EA. When the jog dials 82 and 83 are rotated, the instructing lines LPX and LPY are moved in the longitudinal direction and the lateral direction, respectively. Therefore, the specific area EA is set by rotating the jog dials 82 and 83, and the set key 76 is pressed, so that the specific area is set.

(2) Action of mosaic monitor and color adjustment function

The mosaic monitor is performed by the image memory circuit 1 for storing the image data of the specific area EA and the color tone setting circuit 2 for performing the color correction in a printing process.

The mosaic monitor mode is selected when the function key 78 of the operation panel 70 is pressed. The mosaic monitor is to make various color corrections for the image of the specific area EA set by the operator and print images of the specific area EA having different color balances (referred to as mosaic monitor images hereinafter) on the same copying paper. Therefore, an image having a desirable color balance can be selected by observing the mosaic monitor images. That is, when the operator selects an image having a desirable color balance among the mosaic monitor images by operating a key on the operation panel 70, the color adjustment coefficients for the color adjustment of the selected image are automatically set, and thereafter, the printing operation is performed by using the selected color adjustment coefficients.

In the mosaic monitor mode, first of all, a document set on the document table 15 is scanned by a preparatory scan operation, and then, a specific area EA for which the color adjustment is to be made, for example, an area indicated by oblique lines as shown in FIG. 5, is set with looking at the image of the document displayed on the display section 84 of the operation panel 70 which has been obtained in the above preparatory scan operation. When the specific area EA is set, the image memory circuit 1 stores only image data I corresponding to the specific area EA in a RAM 401 shown in FIG. 8. It is to be noted that the upper limit of the size of the specific area EA is predetermined according to the memory capacity of the RAM 401.

Thereafter, the color tone setting circuit 2 performs various kinds of color correction for the image data I which is outputted from the image memory circuit 1 and is converted into the image data of printing color so as to generate printing image data $I' = KI$ ($k = Ky$, $Km$, $Kc$), wherein the coefficients $Ky$, $Km$ and $Kc$ are the color adjustment coefficients $k$ for yellow color, magenta color and cyan color, respectively.

Figure 6:
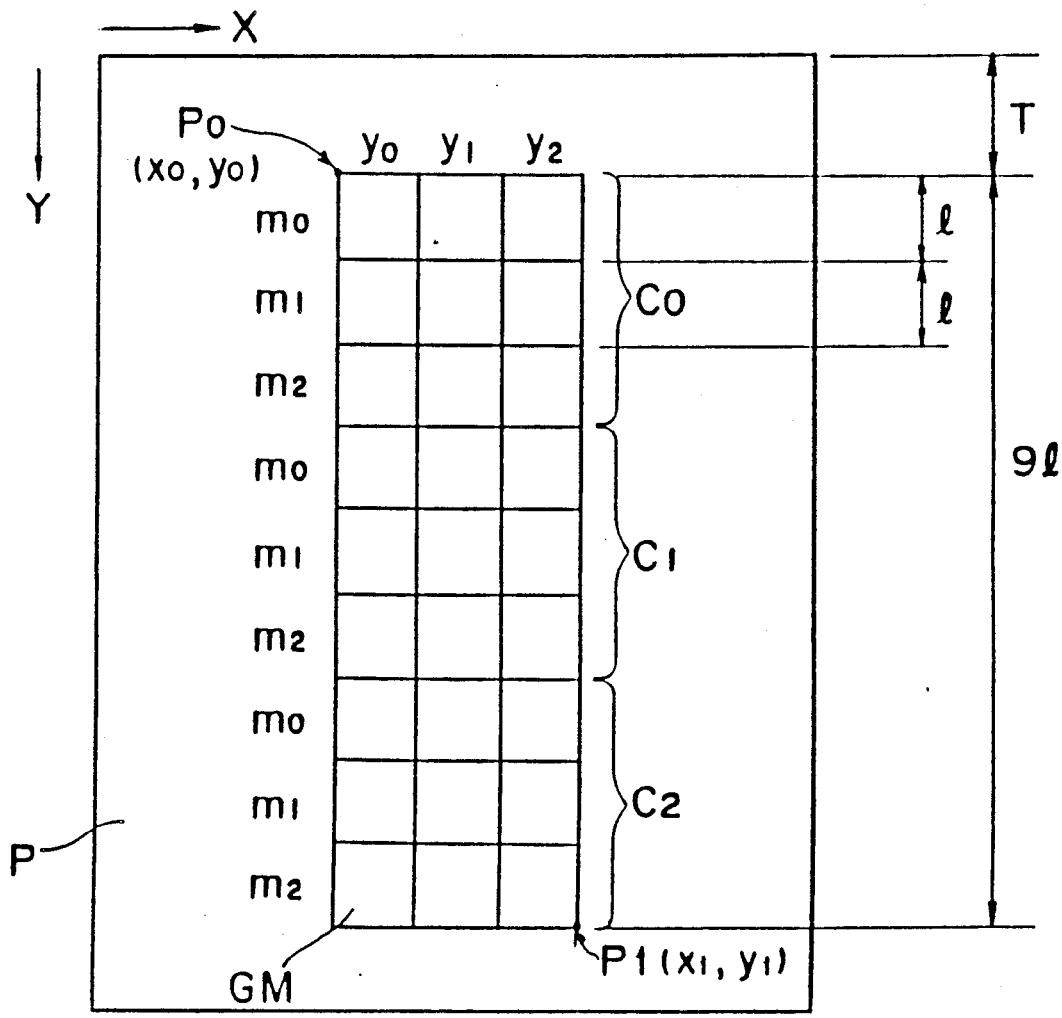
FIG. 6 is a front view showing an output format of printed mosaic monitor images.

FIG. 6 shows one example of the output format of the printing image data $I'$ of the mosaic monitor images.

Referring to FIG. 6, three kinds of color adjustment coefficient $Ky = y_i$, $Km = m_i$ and $Kc = c_i$ ($i = 0, 1, 2$) are used for three colors of cyan color (c), yellow magenta color (m) and yellow color (y), and then, 27 kinds of images ($3 \times 3 \times 3 = 27$) are outputted. The color adjustment coefficients $c_1$, $m_1$ and $y_1$ represent standard values of cyan, magenta and yellow colors, respectively, the color adjustment coefficients $c_0$, $m_0$ and $y_0$ represent values each of which is a product of the standard value and a predetermined factor smaller than one, and the color adjustment coefficients $c_2$, $m_2$ and $y_2$ represent values of cyan, magenta and yellow colors, each of which is a product of the standard value and another predetermined factor larger than one.

In the present preferred embodiment, the color adjustment coefficients $y_0$, $y_2$, $m_0$, $m_2$, $c_0$ and $c_2$ are calculated from the standard coefficients $y_1$, $m_1$ and $c_1$, and an adjustment constant $a_0$ for making a color adjustment as follows:

$$y_0 = y_1 - a_0 \quad (1)$$

$$y_2 = y_1 + a_0 \quad (2)$$

$$m_0 = m_1 - a_0 \quad (3)$$

$$m_2 = m_1 + a_0 \quad (4)$$

$$c_0 = c_1 - a_0 \quad (5)$$

$$c_2 = c_1 + a_0 \quad (6)$$

wherein the standard coefficients $y_1$, $m_1$ and $c_1$, and the adjustment constant $a_0$ for making a color adjustment have been stored previously in a RAM 25R connected to the CPU 25.

The operator selects a desirable color tone among 27 kinds of mosaic monitor images GM shown in FIG. 6, and then, the process of the mosaic monitor mode is completed.

In the case that the operator specifies a desirable color tone from the mosaic monitor images GM, for example, the function keys 78 to 81 are operated according to a message displayed on the display section 84 of the operation panel 70 so as to select one image from the mosaic images GM, and thereafter, the color balance for processing an image is specified. Otherwise, after making the image blocks shown in FIG. 6 display on the display section 84, the function keys 78 to 81 and the ten key 75 may be operated so as to select one of the mosaic images GM, and then, a desirable color balance may be selected.

Next, the image of the document is read out again by the reading section 100, and then, the image having the set color tone is printed by the printer section 200.

The features of the present preferred embodiment according to the present invention are as follows.

Figure 11A:
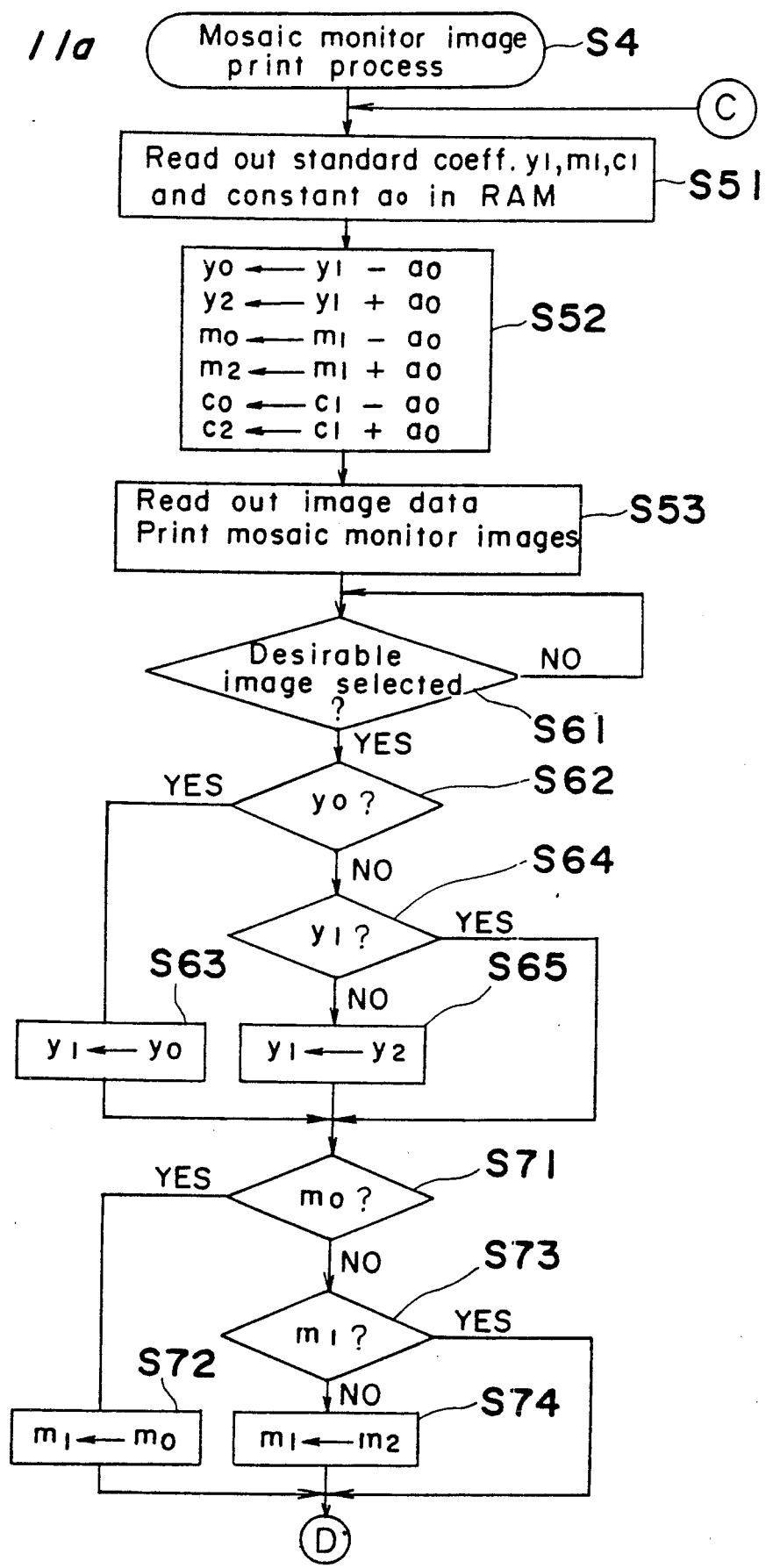
FIGS. 11a and 11b are flowcharts showing a mosaic monitor image printing process shown in FIG. 9.
Figure 11B:
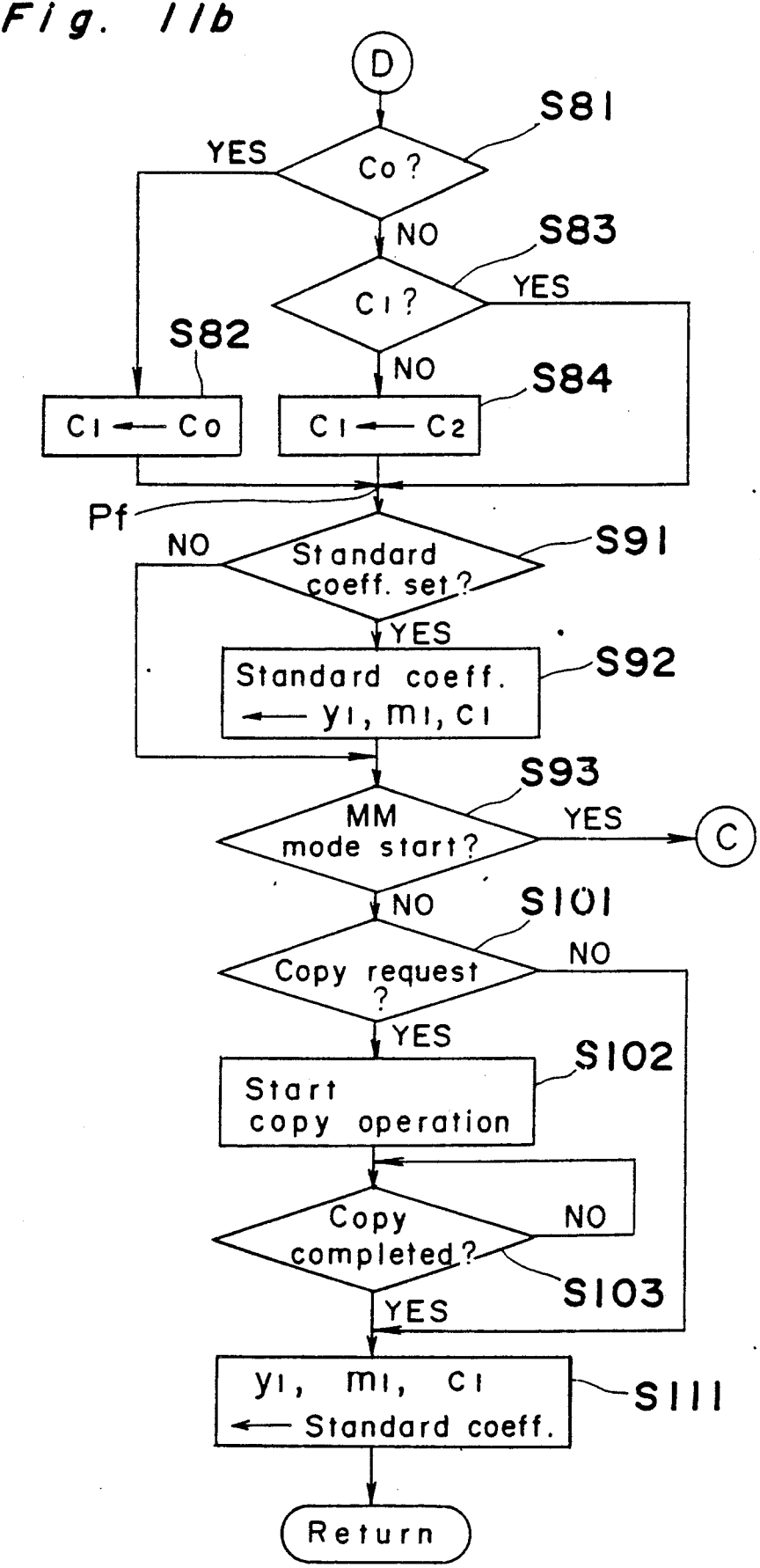

In the case that there is no desirable image for making a color adjustment even though the operator watches the printed mosaic monitor images, when the operator selects one of 27 images among them which is closest to the desirable color balance (Yes at step S61 of FIG. 11a), mosaic monitor images composed of 27 images which are relatively close to the desirable color balance are printed on a piece of printing paper (Yes at step S93 of FIG. 11b). Namely, after the color adjustment coefficients of one of the mosaic monitor images which is selected in the mosaic monitor mode are set and are stored as standard coefficients $y_1$, $m_1$ and $c_1$ in the RAM 25R at step S92 of FIG. 11b without finishing the mosaic monitor mode immediately after printing a first mosaic monitor image, the other color adjustment coefficients are calculated based on the standard coefficients stored in the RAM 25R, and then, the mosaic monitor images are printed on a piece of printing paper again.

Furthermore, the color adjustment coefficients altered thus are set as initial values of the standard coefficients at step S111 of FIG. 11b. Accordingly, since the color adjustment coefficients of the image of which has been reproduced more faithfully among the mosaic monitor images are used as color adjustment coefficients for the next print operation, the color copying operation can be performed using the color adjustment coefficients which have been selected previously, for example, in spite of a change in the color balance as the time goes.

(3) Color tone setting circuit

Figure 7:
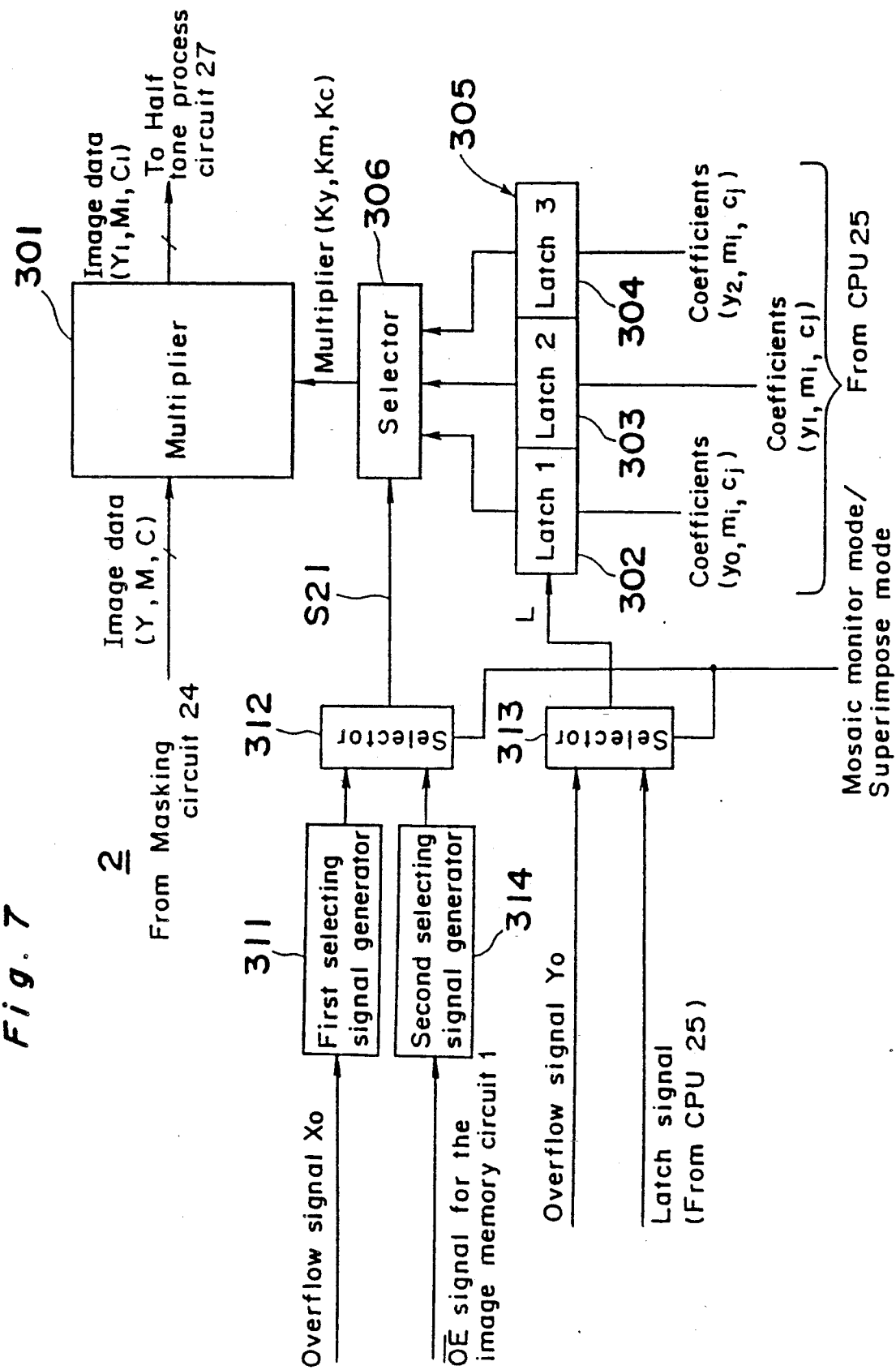
FIG. 7 is a block diagram showing a color tone setting circuit shown in FIG. 2.

FIG. 7 is a block diagram of the color tone setting circuit 2 shown in FIG. 2.

The color tone setting circuit 2 is arranged at the next stage of the masking circuit 24, and makes the color adjustment in the mosaic monitor mode.

Referring to FIG. 7, the masking circuit 24 converts respective image data of red color, green color and blue color into image data Y, M, C and K for printing which correspond to respective printing colors of yellow color, magenta color, cyan color and black color, and outputs the converted image data to the color tone setting circuit 2.

The well known conversion equation for converting the original image data R, G and B into the printing image data Y, M and C is expressed as follows:

$$\begin{bmatrix} Y \\ M \\ C \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} B \\ G \\ R \end{bmatrix} \quad (7)$$

Respective conversion coefficients $a_{00}$ to $a_{22}$ are predetermined at proper values according to the theory and the result of the experiment so that the color image reflecting that of the original document faithfully can be obtained.

In the color adjustment of the color tone setting circuit 2, the following multiplications are performed for respective image data Y, M and C calculated by the above calculation in order to obtain adjusted printing image data $Y_1$, $M_1$ and $C_1$.

$$Y_1 = K_y \times Y, \quad (8)$$

$$M_1 = K_m \times M, \quad (9)$$

$$C_1 = K_c \times C, \quad (10)$$

wherein $K_y$ is the color adjustment coefficient of yellow color,

Km is the color adjustment coefficient of magenta color, and

Kc is the color adjustment coefficient of cyan color.

It is to be noted that, the printing image data K of black color is outputted for a picture element only when all the respective image data of yellow color, magenta color and cyan color are outputted since it is not necessary to make the color adjustment.

In the mosaic monitor mode, different sets of color adjustment coefficients are applied to respective blocks shown in FIG. 6. That is, the reading area designated by the coordinates $P_0(x_0, y_0)$ and $P_1(x_1, y_1)$ is divided into 27 blocks of three rows in the main scan direction X and nine columns in the subscan direction Y, and different sets of color adjustment coefficients are set at respective blocks. In this case, the color adjustment coefficient Ky of yellow color does not vary in the subscan direction Y, however, the coefficient Ky varies in the main scan direction X so that three kinds of coefficients $y_0$, $y_1$ and $y_2$ are set at the three blocks in the main scan direction X, respectively. The color adjustment coefficient Km of magenta color does not vary in the main scan direction X, however, the coefficient Km varies in the subscan direction Y in the order of $m_0$, $m_1$, $m_2$, $m_0$, $m_1$, ... every block. The color adjustment coefficient Kc of cyan color does not vary in the main scan direction X, however, the coefficient Kc varies in the subscan direction Y every three blocks in the order of $c_0$, $c_1$ and $c_2$.

Therefore, the color tone setting circuit 2 sets the color adjustment coefficients for every block of the mosaic monitor image as described above, for respective printing image data Y, M and C in the mosaic monitor mode, and outputs the adjusted printing image data to the magnification varying circuit 26.

Referring to FIG. 7, a multiplexer 301 calculates the aforementioned printing image data $Y_1$, $M_1$ and $C_1$ by using the above equations from the image data Y, M and C input from the masking circuit 24, and outputs the printing image data $Y_1$, $M_1$ and $C_1$ to the half tone process circuit 27. There is provided a latch circuit 305 comprised of three latches 302, 303 and 304 for respectively latching respective three coefficients in the main scan direction X in the mosaic monitor mode, which are input from the CPU 25. Three coefficients latched in the latch circuit 305 correspond to three blocks in the main scan direction X, respectively. Every time a subscan clock signal for varying the magnification is input to the CPU 25 as the interruption signal, the CPU 25 performs an interruption process shown in FIGS. 15a and 15b, and the CPU 25 outputs a latch signal to the color tone setting circuit 2 every block in the subscan direction Y so as to make the latches 302, 303 and 304 latch respective new three coefficients for the next three blocks in the subscan direction Y.

The reason why the above latch circuit 305 comprised of three latches 302, 303 and 304 are provided is that the alteration period of the above coefficients in the main scan direction is relatively shorter than the operation period of the CPU 25, and it is difficult for the CPU 25 to set the above coefficients in the latches 302, 303 and 304 at real time. It is to be noted that, in the case of n kinds of color adjustment coefficients, n latches may be provided in parallel.

The image memory circuit 1 outputs an overflow signal $X_0$ (See FIG. 8) in the main scan direction generated upon reading out the image data stored in an image memory 401 to a first selecting signal generator 311. Every time the first selecting signal generator 311 receives the overflow signal $X_0$, i.e., every time the read operation of each block of the mosaic monitor images is completed, the first selecting signal generator 311 outputs a signal S21 to a selector 306 through a selector 312 so that the selector 306 connects the multiplier 301 selectively to respective latches 302 to 304. In the mosaic monitor mode, the selector 312 outputs the signal S21 input from the first selecting signal generator 311 to the selector 306. In accordance with the signal S21, the selector 306 sends one of respective coefficients latched in the latches 302 to 304 of the latch 305 to the multiplier 301 selectively every block.

On the other hand, the image memory circuit 1 outputs an overflow signal $Y_0$ (See FIG. 8) in the subscan direction generated upon reading out the image data stored in the image memory 401 to the selector 313. In the mosaic monitor mode, the selector 313 outputs the overflow signal $Y_0$ to the latch circuit 305. In accordance with the overflow signal $Y_0$, the latches 302 to 304 latch a set of color adjustment coefficients input from the CPU 25 so as to renew them. That is, as soon as the blocks to be processed are changed in the subscan direction to the next blocks, the set of color adjustment coefficients are altered.

In the mosaic monitor mode, when the operator selects a desirable set of color adjustment coefficients, the selected set of color adjustment coefficients may be set in the latch 302, and may be outputted to the multiplier 301.

In the superimposing mode, the selector 312 outputs a signal input from the second selecting signal generator 314 to the selector 306 so that the color tone of the area on which an image is superimposed can be different from that of the other area. Since this is well known to those skilled in the art, the description thereof is omitted therein.

(4) Image memory circuit

Figure 8:
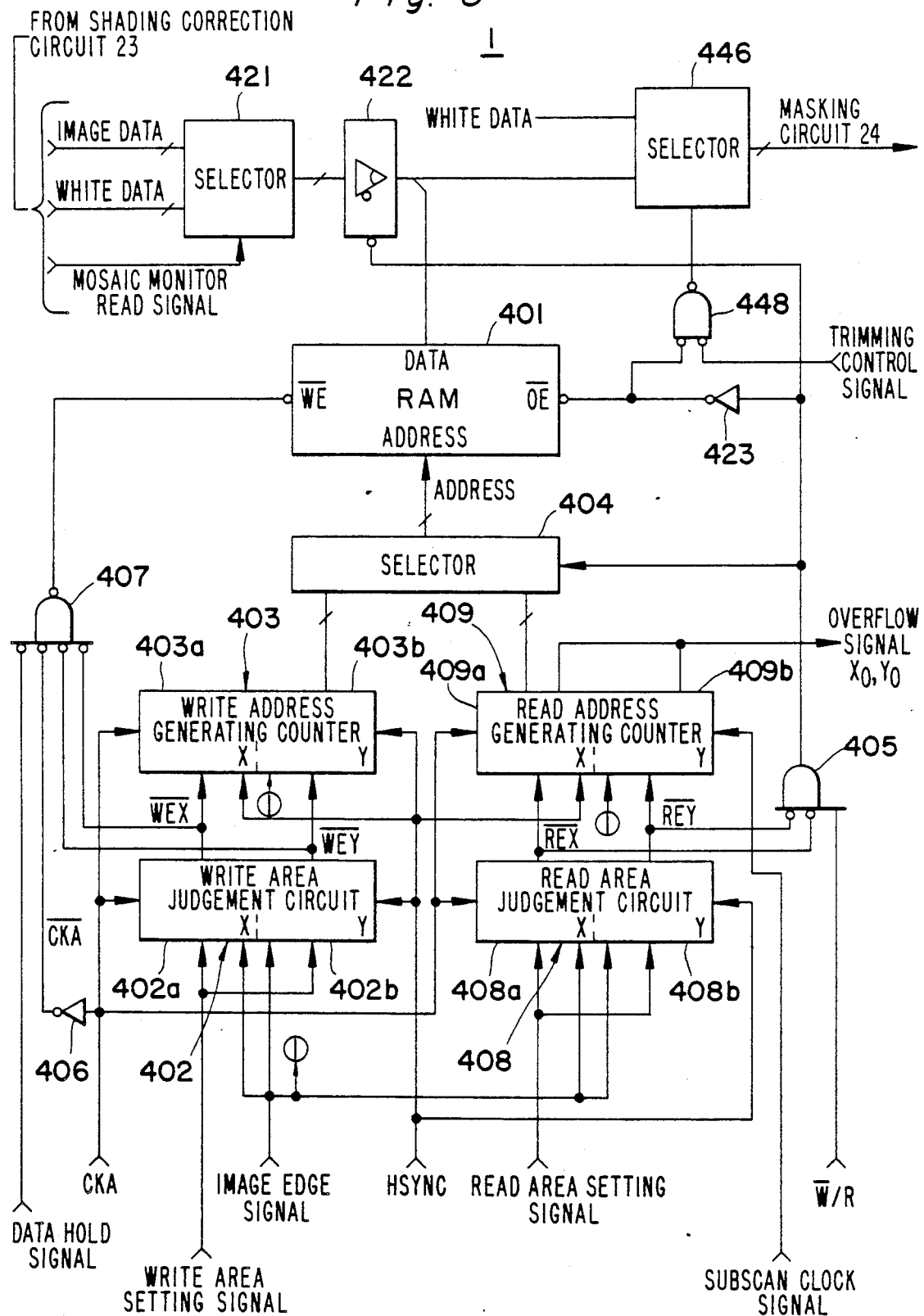
FIG. 8 is a block diagram showing an image memory circuit shown in FIG. 2.

FIG. 8 shows the image memory circuit 1 for storing an image of a specific area EA of a document (referred to as a registered image hereinafter) in the mosaic monitor mode, and for reading out the registered image to be printed on any specific position of a copying paper in order to print the registered image as the mosaic monitor image.

Referring to FIG. 8, the RAM 401 is provided for storing image data of the specific area EA. A selector 421 selects either one of image data which is processed with the shading correction in the shading correction circuit 23 and white data input from the shading correction circuit 23 in accordance with the mosaic read signal input from the shading correction circuit 23, and outputs the selected data to the RAM 401 and a selector 446 through a three-state buffer amplifier 422. The output terminal of three-state buffer amplifier 422 is made a high impedance state only when the registered image is read out from the RAM 401 (i.e., $\overline{OE}$ = "1") upon printing the mosaic monitor image, and in the other cases, i.e., when the mosaic monitor image is not printed in the mosaic monitor mode, the three-state buffer amplifier 422 outputs white data. Furthermore, when image data of a specific area EA of a document is stored in the RAM 401 in the mosaic monitor mode, the three-state buffer amplifier 422 outputs the image data to the RAM 401.

In the mosaic monitor mode, in order to make a color adjustment for the registered image data, the image data is stored in the RAM 401 temporarily by using the selector 446 and the three-state buffer amplifier 422 before the processes performed by the circuits 24, 25, 26 and 27. After the image data is read out from the RAM 401, various kinds of color adjustments are made for the mosaic monitor image, and the color-adjusted mosaic monitor image is printed on a copying paper.

A write area judgment circuit 402 judges whether or not the image data read by the reading section 100 is within a write area in the main scan direction X and in the subscan direction Y in accordance with write area setting signals in the main scan direction X and in the subscan direction Y which are input from the CPU 25. When the image data read by the reading section 100 is within the above write area, the write area judgment circuit 402 outputs Low level signals $\overline{WEX}$ and $\overline{WEY}$ to inverted input terminals of an AND gate 407 and a write address generating counter 403. The AND gate 407 outputs the clock signal $\overline{CKA}$ to a write enable terminal $\overline{WE}$ of the RAM 401 in accordance with the Low level signals $\overline{WEX}$ and $\overline{WEY}$, so as to store the image data in the RAM 401.

Similarly, a read area judgment circuit 408 judges whether or not the image data read by the reading section 100 is within a read area in the main scan direction X and in the subscan direction Y in accordance with read area setting signals in the main scan direction X and in the subscan direction Y which are input from the CPU 25. When the image data read by the reading section 100 is within the above read area, the read area judgment circuit 408 outputs Low level signals $\overline{REX}$ and $\overline{REY}$ to inverted input terminals of an AND gate 405 and a read address generating counter 409. The above read area is predetermined according to the output format.

In accordance with Low level signals $\overline{REX}$ and $\overline{REY}$, the AND gate 405 outputs a read signal $\overline{W/R}$ to an output enable terminal $\overline{OE}$ of the RAM 401 through an inverter 423, i.e., a Low level signal is input to the output enable terminal $\overline{OE}$ of the RAM 401 so that the reading operation of the RAM 401 is enabled.

The write address generating counter 403 generates a write address for storing image data in the RAM 401 in accordance with the clock signal CKA, the horizontal synchronizing signal Hsync, and the above signals $\overline{WEX}$ and $\overline{WEY}$, and outputs the generated write address to the address terminal of the RAM 401 through a selector 404. Similarly, the read address generating counter 409 generates a read address for reading out image data stored in the RAM 401 in accordance with the clock signal CKA, the subscan clock signal, and the above signals $\overline{REX}$ and $\overline{REY}$, and outputs the generated read address to the address terminal of the RAM 401 through the selector 404. The above selector 404 selectively outputs either the write address or the read address to the address terminal of the RAM 401 in accordance with the write/read signal $\overline{W}/R$. It is to be noted that both the write address and the read address are generated as an address of one dimension by a multiplier (not shown) based on an address in the main scan direction X and an address in the subscan direction Y generated by the write address generating counter 403 and the read address generating counter 409, respectively.

The selector 446 and the AND gate 448 are provided to output white data on the area of the superimposing image upon printing the image of the document in the superimposing mode. The detailed description of the selector 446 and the AND gate 448 is omitted since they are not the subject matter of the present invention. Except for the case that a trimming signal is outputted in the superimposing mode, the selector 446 selectively outputs either a signal outputted from the three-state buffer amplifier 442 or a signal outputted from the RAM 401.

The action of the image memory circuit 1 will be described below in detail.

In the case that the registered image is stored in the RAM 401, when the operator specifies a specific area EA of a document using the jog dials 82 and 83 as shown in FIG. 5, the CPU 25 calculates the coordinate $(x_0, y_0)$ of the top left edge $P_0$ of the specific area EA and the coordinate $(x_1, y_1)$ of the bottom right edge $P_1$ thereof in order to determine the ranges of the specific area EA in the main scan direction X and the subscan direction Y, and outputs the above calculated coordinates $(x_0, y_0)$ and $(x_1, y_1)$ as the write area setting signal for representing the write area in the main scan direction X and the subscan direction Y to an X section 402a and a Y section 402b of the write area judgment circuit 402, respectively. The X section 402a and the Y section 402b of the write area judgment circuit 402 count the horizontal synchronizing signal Hsync and the clock signal CKA when the image edge signal is input thereto, and judges whether or not the counting value is within the write area setting area. Then, when the counting value x in the main scan direction X of the X section 402a is within the range from the value $x_0$ to the value $x_1$, i.e., $x_0 \leq x \leq x_1$, the X section 402a outputs a Low level signal $\overline{WEX}$ to the X section 403a of the write address generating counter 403. When the counting value y in the subscan direction Y of the Y section 402b is within the range from the value $y_0$ to the value $y_1$, i.e., $y_0 \leq y \leq y_1$, the Y section 402b outputs a Low level signal $\overline{WEY}$ to the Y section 403b of the write address generating counter 403. When the write address generating counter 403 judges that the counting values x and y are within the write area, the counter 403 generates a write address and outputs it to the address terminal of the RAM 401 through the selector 404. That is, the X section 403a of the write address generating counter 403 counts the clock signal CKA when the Low level signal $\overline{WEX}$ is input thereto, and generates the counting value as the address in the main scan direction X. The address generated by the X section 403a is cleared in accordance with the horizontal synchronizing signal Hsync. Furthermore, the Y section 403b of the write address generating counter 403 counts the horizontal synchronizing signal Hsync when the Low level signal $\overline{WEY}$ is input thereto, and generates the counting value as the address in the subscan direction Y. The addresses generated by the X section 403a and the Y section 403b are cleared in accordance with the image edge signal which is generated by the CPU 25.

The write address generating counter 403 comprises a multiplier (not shown) and an adder (not shown) for calculating addresses of one dimension, each of which is a product of the address in the main scan direction X generated by the X section 403a and the address in the subscan direction Y generated by the Y section 403b.

In the case that the address of one dimension is generated by the write address generating counter 403 and the image data are stored in the RAM 401, the data hold signal is set at a Low level, and the write/read signal $\overline{W/R}$ is set at a Low level. Then, in accordance with a selecting signal input through the AND gate 405, the selector 404 outputs the address input from the write address generating counter 403 to the address terminal of the RAM 401. Also, the clock signal $\overline{CKA}$ is input to the write enable terminal $\overline{WE}$ of the RAM 401 through the inverter 406 and the AND gate 407 so as to allow the image data to be stored in the RAM 401. Furthermore, since the write/read signal $\overline{W/R}$ is set at a Low level as described above, the Low level write/read signal $\overline{W/R}$ is input to the disable terminal of the buffer amplifier 422 through the AND gate 405, the buffer amplifier 422 is enabled only on the condition that image data of a document is stored in the RAM 401, i.e., the Low level signals $\overline{REX}$ and $\overline{REY}$ are outputted from the read area judgment circuit 408 to the AND gate 405, and then, the buffer amplifier 422 outputs the image data to the data terminal of the RAM 401.

Then, only the image data of the area which the write area judgment circuit 402 judges within the specific area in the main scan direction X and in the subscan direction Y can be stored in the RAM 401. When the image data of the above area has been stored in the RAM 401 completely, the CPU 25 outputs the High level data hold signal to the write enable signal $\overline{WE}$ of the RAM 401 through the AND gate 407 so as to inhibit the write operation of the RAM 401, resulting in that the image data is held by the RAM 401.

It is necessary to read out the image data stored in the RAM 401 so as to print mosaic monitor images at the specific read area in the output format shown in FIG. 6. The composition of the circuit for reading out the image data is substantially the same as that of the circuit for storing the image data.

The setting values, which can be judged within the range of the specific read area on the condition that $x_0 \leq x \leq x_1$ and $y_0 \leq y \leq y_1$, are preset by the CPU 25 in the X section 408a and the Y section 408b of the read area judgment circuit 408 for judging a read area on a copying paper, wherein $x_0$ and $y_0$ are an X-coordinate and a Y-coordinate of the top left edge of the specific read area, respectively, and $x_1$ and $y_1$ are an X-coordinate and a Y-coordinate of the bottom right edge thereof, respectively, as shown in FIG. 6. After the image edge signal is input to the read area judgment circuit 408 when the document is scanned, the read area judgment circuit 408 counts the horizontal synchronizing signal Hsync and the clock signal CKA, and also judges whether or not the counting values thereof are within the range of the specific read area. Then, when the counting value in the main scan direction X is within the range of the specific read area, the X section 408a of the read area judgment circuit 408 outputs the Low level signal $\overline{REX}$ to the X section 409a of the read address generating counter 409. When the counting value in the subscan direction Y is within the range of the specific read area, the Y section 408b of the read area judgment circuit 408 outputs the Low level signal $\overline{REY}$ to the Y section 409b of the read address generating counter 409.

When the read area judgment circuit 408 judges that the image data read by the reading section 100 is within the read area, i.e., the Low signals $\overline{REX}$ and $\overline{REY}$ are input to the read address generating counter 409, the read address generating counter 409 generates the read address, and outputs the generated read address to the address terminal of the RAM 401 through the selector 404 since the High write/read signal $\overline{W/R}$ is input to the selector 404 upon reading out the image data stored in the RAM 401. That is, the X section 409a of the read address generating counter 409 counts the clock signal CKA when the Low signal $\overline{REX}$ is input thereto, and generates the address in the main scan direction X. The address generated by the X section 409a is cleared in accordance with the horizontal synchronizing signal Hsync. Furthermore, the Y section 409b of the read address generating counter 409 counts the subscan clock signal input from the subscan clock generator 29 when the Low level signal $\overline{REY}$ is input thereto, and generates the address in the subscan direction. The Y section 409b counts the subscan clock signal in place of the horizontal synchronizing signal Hsync in order to vary the magnification. It is to be noted that the address generated by the Y section 409b is cleared in accordance with the image edge signal generated by the CPU 25. In the read address generating counter 409, the product of the address in the main scan direction X generated by the X section 409a and the address in the subscan direction Y generated by the Y section 409b are calculated by a multiplier (not shown) and an adder (not shown), and the calculated product is outputted as the address of one dimension to the RAM 401 through the selector 404.

The image data read out from the RAM 401 is sent to the masking process circuit 24 through the selector 446. Then, of course, the read address counter 409 generates the address larger than the maximum address of the RAM 401, however, in this case, the X and Y sections 409a and 409b thereof output an overflow signal $X_0$ and an overflow signal $Y_0$ to the color tone setting circuit 2, respectively, every time the counting values of the X and Y sections 409a and 409b thereof become larger than the maximum counting values thereof, and then, the X and Y sections 409a and 409b start to count the values from the initial values again. The overflow signals $X_0$ and $Y_0$ are used for printing a plurality of images respectively having different color tones when the images are arranged in the horizontal direction in the mosaic monitor mode.

Furthermore, since the write/read signal $\overline{W/R}$ becomes a High level upon reading out the image data stored in the RAM 401, the Low write/read signal $\overline{W/R}$ is input to the output enable terminal $\overline{OE}$ of the RAM 401 through the AND gate 405 and the inverter 423, and then, the image data stored in the RAM 401 can be read out in the read area, i.e., in the case of $\overline{REX}$ ="Low" and $\overline{REY}$ ="Low". On the other hand, since the Low write/read signal $\overline{W}/R$ is input to the three-state buffer amplifier 422 through the AND gate 405 in the case of $\overline{REX}$ ="Low" and $\overline{REY}$ ="Low", the output terminal of the three-state buffer amplifier 422 becomes a High impedance state, and then, the output terminal of the buffer amplifier 422 is separated from the data terminal of the RAM 401.

Furthermore, when image data stored in the RAM 401 can be read out, i.e., $\overline{OE}$ ="Low", the selector 446 selects the image data read out from the RAM 401 in accordance with the trimming control signal input through the AND gate 448. On the other hand, in the other cases, since it is necessary to read out the image data stored in the RAM 401 so as to print the image of the image data in the output format shown in FIG. 6, the selector 446 selects white data in order to print white color image in the area other of a copying paper than the area where the image of the image data is printed as described above. Then, the coordinates, which the difference between the magnification upon reading out an image of a document and the magnification upon printing the image of the image data stored in the RAM 401 are taken into consideration, are set in the X and Y sections 408a and 408b of the read area judgment circuit 408, respectively. It is to be noted that the period of the subscan clock signal for varying the magnification is varied according to the magnification upon reading out an image of a document.

In the case that the images of 3×9 blocks are printed as shown in FIG. 6, the image data is read out from the RAM 401 in the following manner. That is, the image data of the same line is read out in the main scan direction X three times, and after the image data is completely read out in the subscan direction Y over the whole area, the image data is read out in the main scan direction from the top line again.

When the X and Y sections 408a and 408b of the read area judgment circuit 408 for judging the read area on a copying paper output the Low signals $\overline{REX}$ and $\overline{REY}$ to the X and Y sections 409a and 409b of the read address generating counter 409, respectively, the X and Y sections 409a and 409b generate the address, and the image data stored in the generated address is read out and is sent to the masking circuit 24 through the selector 446. The CPU 25 sets setting values in the X section 408a which can judge that the counting value x is in the range of the read area if $x_0 \leq x \leq x_1$, and also the CPU 25 sets setting values in the Y section 408b which can judge that the counting value y is in the range of the read area if $y_0 \leq y \leq y_1$. When the counting value of the read address generating counter 409 becomes larger than the value which is the maximum size $(=(x_1-x_0)/3)$ of one block, the read address generating counter 409 outputs the overflow signal $X_0$, and starts to count the value from an initial value again, and then, the image data of the same horizontal line is read out. The above process is repeated three times. When the Y section 409b of the read address generating counter 409 counts the value $(y_1-y_0)/9$ in the subscan direction, three blocks of image data has been read out completely, and then, the Y section 409b outputs the overflow signal $Y_0$. Thus, three images are printed in the horizontal direction on a piece of copying paper. The printing operation of three images printed in the horizontal direction is repeated in the subscan direction nine times, and then, the mosaic monitor image comprised of 27 blocks (=3×9) of images has been completely printed on the copying paper.

Figure 13A:
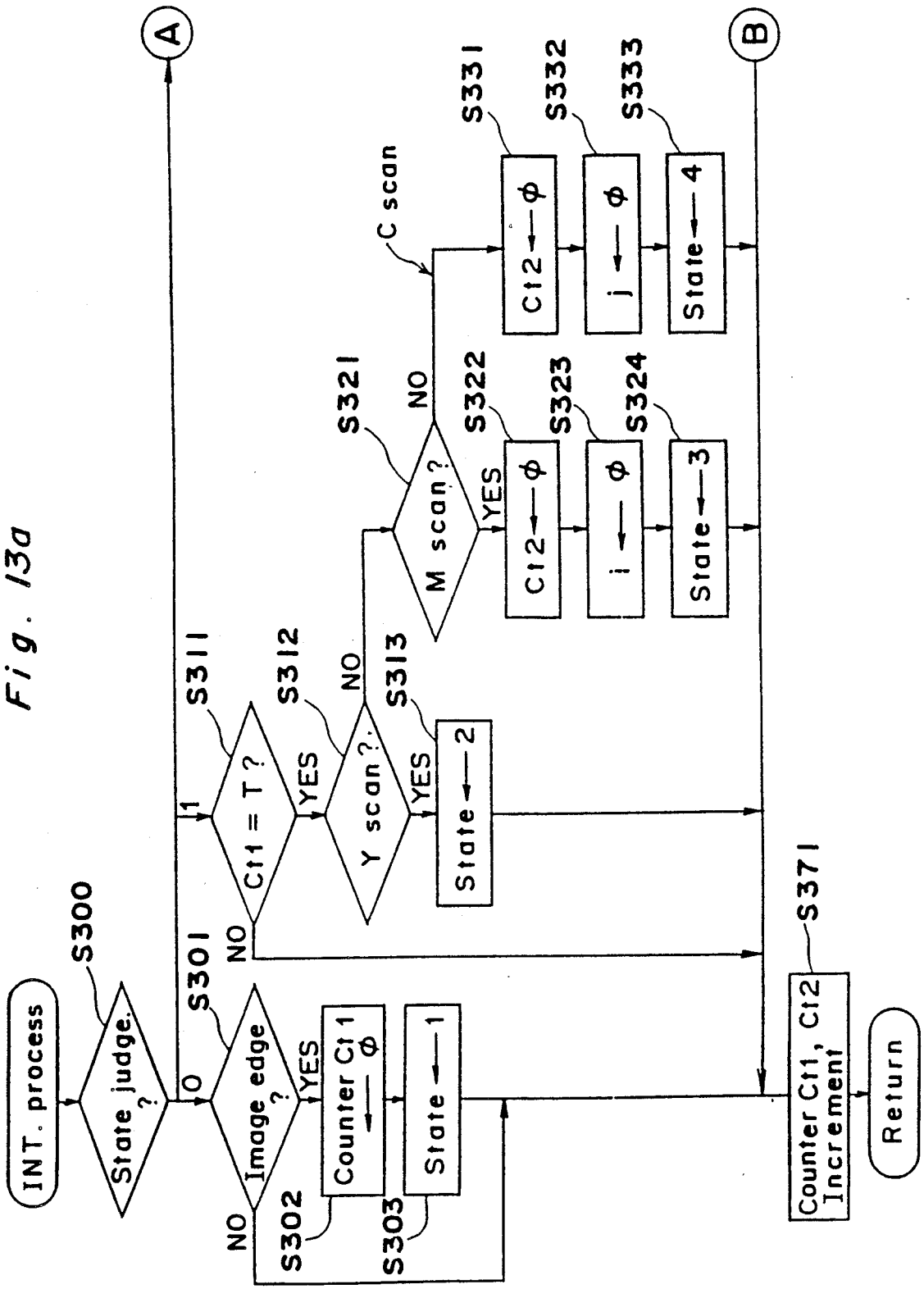
FIGS. 13a and 13b are flowcharts showing an interruption process for setting color adjustment coefficients which is executed by the CPU shown in FIG. 2.
Figure 13B:
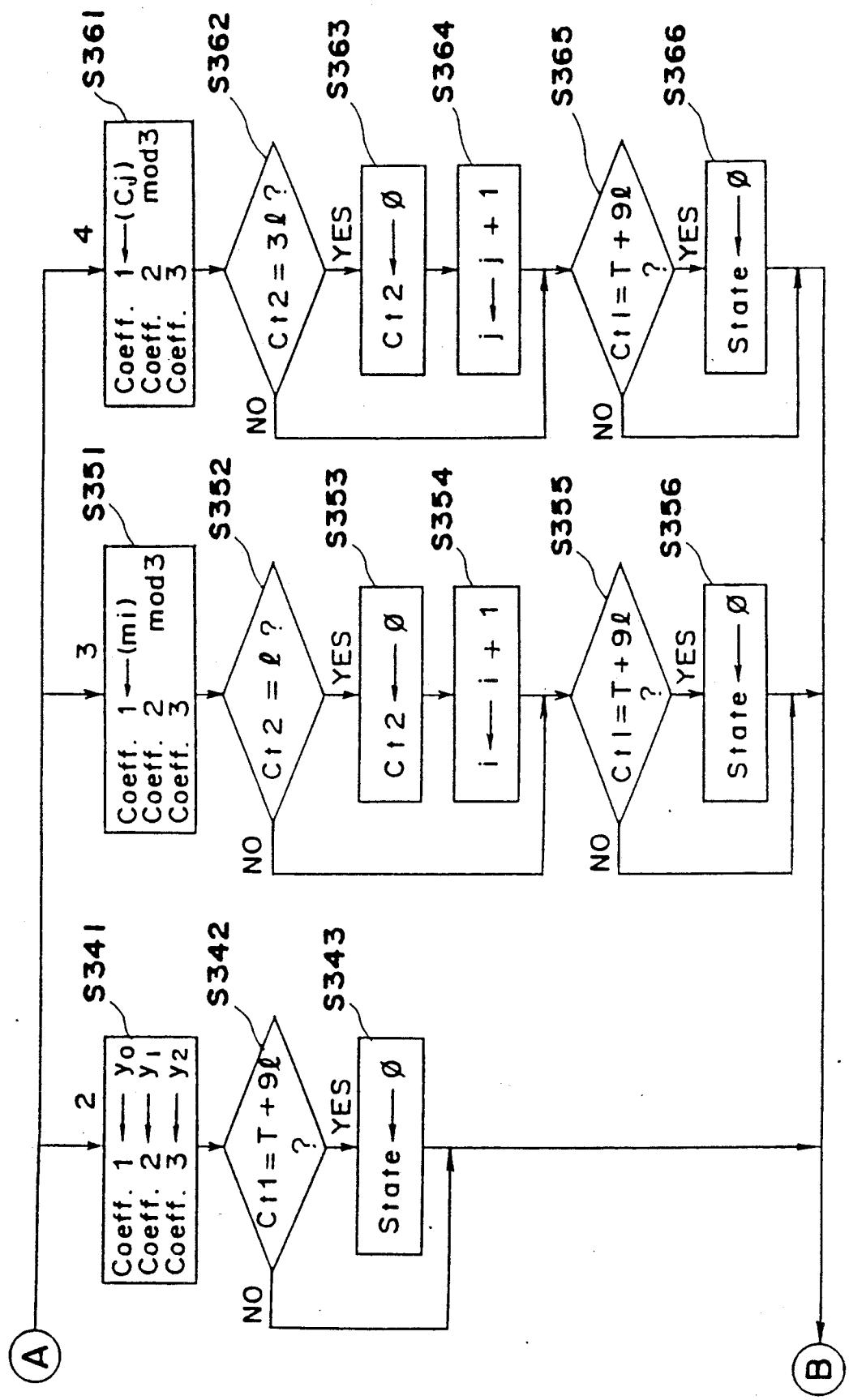

Since different color adjustment coefficients are set at respective blocks of the mosaic monitor image in accordance with the overflow signals $X_0$ and $Y_0$ as shown in FIGS. 13a and 13b, respective images for which different color adjustments have been made are printed on the copying paper.

(5) Control flow in the mosaic monitor mode
(5-1) Main routine

Figure 9:
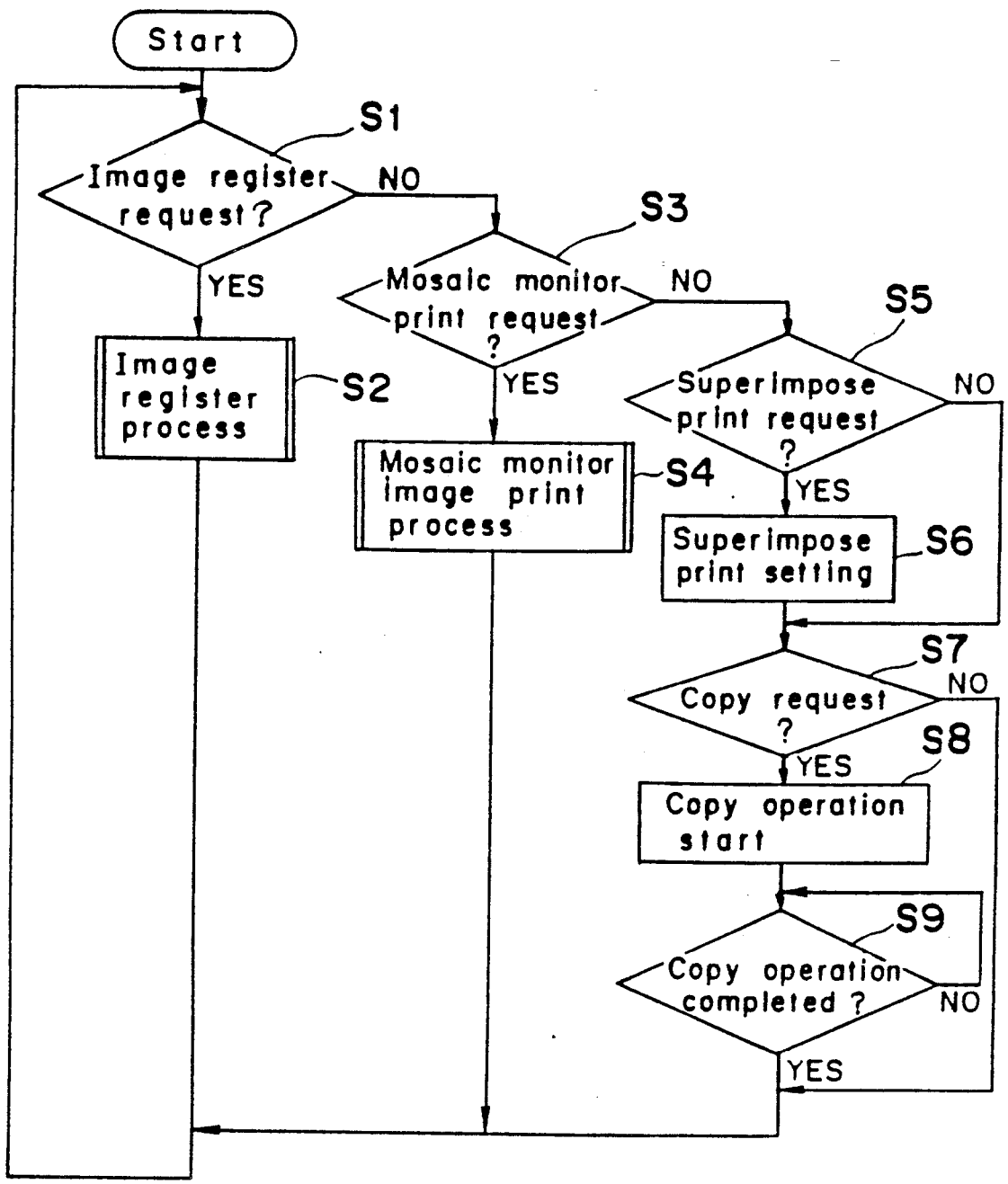
FIG. 9 is a flowchart showing a main routine of a mosaic monitor mode and a superimposing mode of the digital color copying machine which is executed by a CPU shown in FIG. 2.

FIG. 9 is a flowchart of a main routine of the mosaic monitor mode and the superimposing mode which is executed by the CPU 25 for controlling the digital color copying machine.

When the main switch is turned on, the power is supplied to the digital color copying machine, and the CPU 25 and the peripheral units thereof are initialized, wherein the standard coefficients $y_1$, $m_1$ and $c_1$ are set at predetermined initial values and are stored in the RAM 25R. Thereafter, when either the function key 78 or 79 is pressed, the superimposing mode or the mosaic monitor mode is set respectively, and then, the program flow enters the main routine shown in FIG. 9.

In the digital color copying machine of the present preferred embodiment, when the mosaic monitor mode is selected, an image register process is required (Yes at step S1), and also it is required to print the mosaic monitor images (Yes at step S3). On the other hand, when the superimposing mode is selected, the image register process is required (Yes at step S1), and also it is required to print one image superimposed on another image in the superimposing mode (Yes at step S5).

Figure 10:
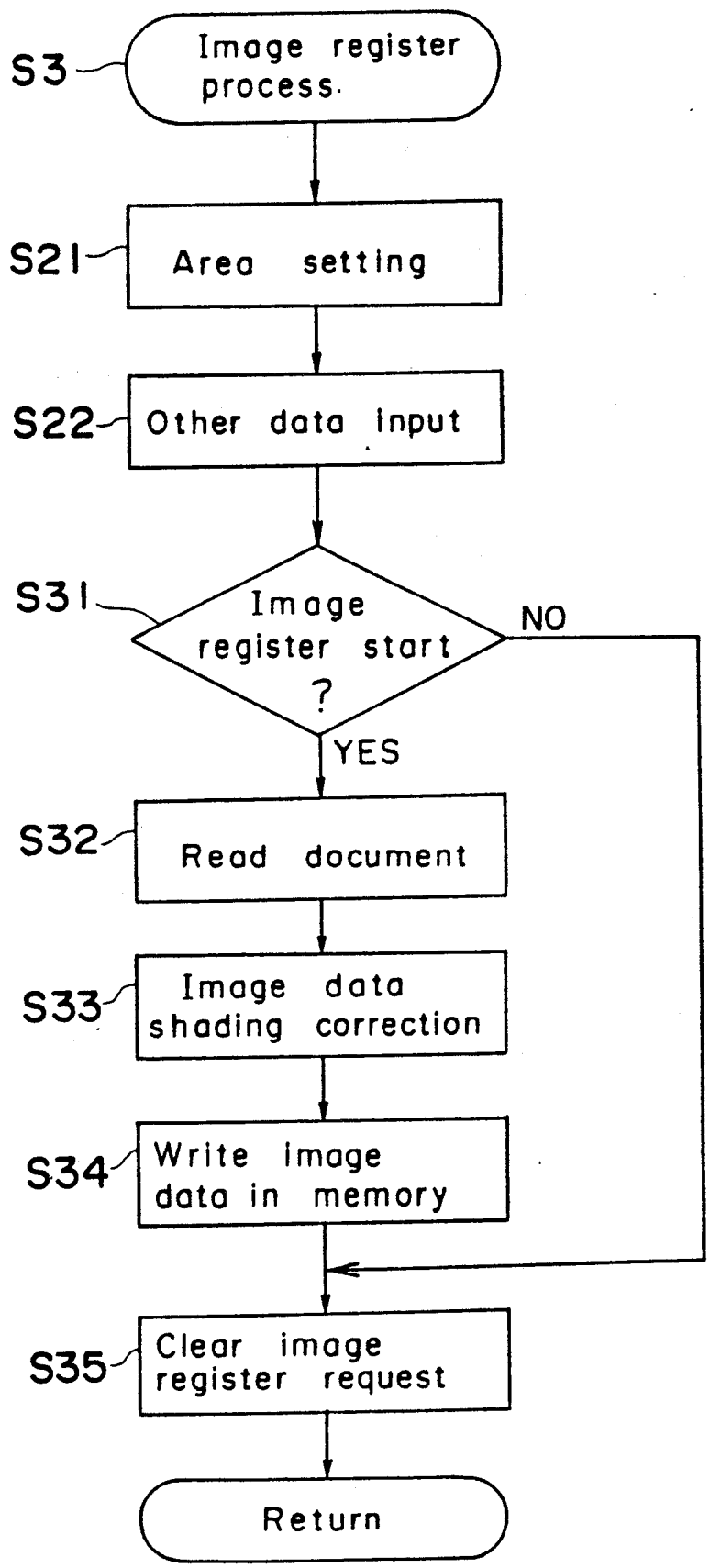
FIG. 10 is a flowchart showing an image register process shown in FIG. 9.

Referring to FIG. 9, if the image register process is required (Yes at step S1), the image register process shown in FIG. 10 is performed at step S2. "The image resister" is to store the image data of the specified area in the RAM 401.

In the above image register process, an image of a document is read by the reading section 100, and the read image is displayed on the display section 84. Thereafter, a specific area EA is set by using the jog dials 82 and 83, and the set key 76, and the address of the specific area EA is outputted to the write area adjustment circuit 402.

If it is required to print the mosaic monitor images on a piece of copying paper (Yes at step S3), the mosaic monitor image printing process shown in FIGS. 11a and 11b is performed at step S4. In the mosaic monitor printing process, the image data stored in the RAM 401 is read out, and various kinds of color adjustments are made for the read image data, and thereafter, the mosaic monitor images comprised of 27 images for which the above color adjustments have been made are printed on a piece of copying paper. Then, the copying conditions such as the number of prints, the printing magnification etc. are reset to predetermined initial values, respectively, and the level of the density adjustment is set at a standard level. Thereafter, the operator selects an image having a desirable color tone among the printed mosaic monitor images, and presses the print start key 71 of the operation panel 70 in order to request a copying operation (Yes at step S7). Then, the copying operation is started at step S8, and when the copying operation is completed (Yes at step S9), the image having the selected color balance is printed on a piece of copying paper.

If it is required to print one image superimposed on another image in the superimposing mode (Yes at step S5), the superimposing printing setting process is performed at step S6. Namely, after checking whether or not the registered image is stored in the RAM 401, the registered image stored therein is read out. Thereafter, when the copying operation is required (Yes at step S7), the copying operation is performed at steps S8 and S9 so as to print the registered image on an image of a document.

If the image register is not required (No at step S1), it is not required to print the mosaic monitor image on a piece of copying paper (No at step S3), and it is not required to print one image superimposed on another image in the superimposing mode (No at step S5), the above copying operation is performed at steps S7 to S9.

(5-2) Image register process

FIG. 10 is a flowchart of the image register process (step S2 of FIG. 9).

Referring to FIG. 10, when the set key 76 of operation panel 70 is pressed, the area setting values of the specific area set on the display section 84 are inputted and set at step S21, and then, the other setting values are inputted and set at step S22.

Thereafter, it is judged whether or not the image register process is started at step S31. When the image register process is started (Yes at step S31), the coordinates of the top right edge and the bottom left edge of the stored image area are calculated from the area setting values having been input at step S21, and only the document image of the stored image area is read out at step S32. Thereafter, the shading correction is made for the image data of the read document image at step S33, and the corrected image data is stored in the RAM 401 at step S34. Thereafter, it is cleared to request the image resister process at step S35, and then, the program flow returns.

On the other hand, when the image resister process is not started (No at step S31), it is cleared to request the image resister process at step S35, and then, the program flow returns.

(5-3) Mosaic monitor image printing process

FIGS. 11a and 11b are flowcharts showing the mosaic monitor image printing process (step S4) shown in FIG. 9.

Referring to FIG. 11a, first of all, the standard coefficients $y_1$, $m_1$ and $c_1$ and the adjustment constant $a_0$ are read out from the RAM 25R at step S51, and then, the color adjustment coefficients $y_i$, $m_i$ and $c_i$, (i=0, 2) are calculated using the above equations (1) to (6), from the standard coefficients $y_1$, $m_1$ and $c_1$ and the adjustment constant $a_0$ at step S52. It is to be noted that the standard coefficients $y_1$, $m_1$ and $c_1$ are set at the predetermined initial values and are stored in the RAM 25R when the digital color copying machine is turned on. However, as described in detail later, the standard coefficients $y_1$, $m_1$ and $c_1$ corresponding to an image selected among the mosaic monitor image may be stored in the RAM 25R at step S92 of FIG. 11b, and further, the standard coefficients $y_1$, $m_1$ and $c_1$ may be altered at step S111 of FIG. 11b.

Thereafter, after the calculated color adjustment coefficients $y_i$, $m_i$ and $c_i$, (i=0, 2) are set, the image data stored in the RAM 401 are read out, and then, the mosaic monitor images are printed on a piece of copying paper at step S53.

Thereafter, when the operator selects an image having a desirable color balance from among the mosaic monitor images using the display section 84 (Yes at step S61), the color adjustment coefficients are set corresponding to the selected image as follows.

First of all, it is judged at step S62 whether or not the color adjustment coefficient of yellow color of the selected image coincides with the color adjustment coefficient $y_0$ which has been calculated at step S52. If the selected color adjustment coefficient thereof coincides with the calculated color adjustment coefficient $y_0$ (Yes at step S62), the standard coefficients $y_1$ is set at the calculated color adjustment coefficient $y_0$ at step S63, and then, the program flow goes to step S71. On the other hand, if the selected color adjustment coefficient thereof does not coincide with the calculated color adjustment coefficient $y_0$ (No at step S62), it is judged whether or not the color adjustment coefficient of yellow color of the selected image coincides with the standard coefficient $y_1$ stored in the RAM 25R at step S64.

If the color adjustment coefficient of yellow color of the selected image coincides with the standard coefficient $y_1$ (Yes at step S64), the program flow goes to step S71, directly. On the other hand, if the color adjustment coefficient of yellow color of the selected image does not coincide with the standard coefficient $y_1$ (No at step S64), the standard coefficient $y_1$ is set at the calculated color adjustment coefficient $y_2$ at step S65, and then, the program flow goes to step S71.

At step S71, it is judged whether or not the color adjustment coefficient of magenta color of the selected image coincides with the color adjustment coefficient $m_0$ which has been calculated at step S52. If the selected color adjustment coefficient thereof coincides with the calculated color adjustment coefficient $m_0$ (Yes at step S71), the standard coefficients $m_1$ is set at the calculated color adjustment coefficient $m_0$ at step S72, and then, the program flow goes to step S81 of FIG. 11b. On the other hand, if the selected color adjustment coefficient thereof does not coincide with the calculated color adjustment coefficient $m_0$ (No at step S71), it is judged whether or not the color adjustment coefficient of magenta color of the selected image coincides with the standard coefficient $m_1$ stored in the RAM 25R at step S73.

If the color adjustment coefficient of magenta color of the selected image coincides with the standard coefficient $m_1$ (Yes at step S73), the program flow goes to step S81 of FIG. 11b, directly. On the other hand, if the color adjustment coefficient of magenta color of the selected image does not coincide with the standard coefficient $m_1$ (No at step S73), the standard coefficient $m_1$ is set at the calculated color adjustment coefficient $m_2$ at step S74, and then, the program flow goes to step S81 of FIG. 11b.

Referring to FIG. 11b, at step S81, it is judged whether or not the color adjustment coefficient of cyan color of the selected image coincides with the color adjustment coefficient $c_0$ which has been calculated at step S52. If the selected color adjustment coefficient thereof coincides with the calculated color adjustment coefficient $c_0$ (Yes at step S81), the standard coefficients $c_1$ is set at the calculated color adjustment coefficient $c_0$ at step S82, and then, the program flow goes to step S91. On the other hand, if the selected color adjustment coefficient thereof does not coincide with the calculated color adjustment coefficient $c_0$ (No at step S81), it is judged whether or not the color adjustment coefficient of cyan color of the selected image coincides with the standard coefficient $c_1$ stored in the RAM 25R at step S83.

If the color adjustment coefficient of cyan color of the selected image coincides with the standard coefficient $c_1$ (Yes at step S83), the program flow goes to step S91, directly. On the other hand, if the color adjustment coefficient of cyan color of the selected image does not coincide with the standard coefficient $c_1$ (No at step S83), the standard coefficient $c_1$ is set at the calculated color adjustment coefficient $c_2$ at step S84, and then, the program flow goes to step S91.

It is to be noted that a program flow point located between steps S84 and S91 is referred to as a program flow point Pf as shown in FIG. 11b hereinafter.

Figure 12:
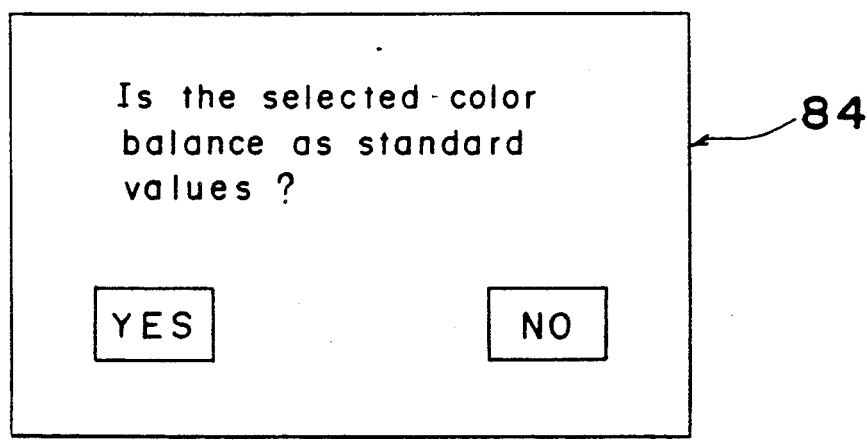
FIG. 12 is a front view showing a message displayed on the display section of the operation panel shown in FIG. 4.

Thereafter, it is judged whether or not the operator wishes to set the selected color adjustment coefficients as the standard coefficients $y_1$, $m_1$ and $c_1$, respectively, at step S91. Then, a message "Is the selected color balance as standard values?" is displayed on the display section 84 of the operation panel 70, as shown in FIG. 12. Responsive to this, the operator enters an answer "Yes" or "No" for the message using the jog dials 82 and 83 and the set key 76. If the operator wishes to set them as the standard coefficients $y_1$, $m_1$ and $c_1$, respectively, (Yes at step S91), the color adjustment coefficients which have been selected at steps S62 to S84 are stored as the standard coefficients $y_1$, $m_1$ and $c_1$, respectively, in the RAM 25R at step S92, and then, the program flow goes to step S93. Otherwise (No at step S91), the program flow goes to step S93, directly.

Thereafter, it is judged whether or not the mosaic monitor mode is started at step S93. For example, when the operator wishes to print the mosaic monitor images under the condition of the standard coefficients $y_1$, $m_1$ and $c_1$ which have been newly set on a piece of printing paper, he presses the function key 78 in order to start the mosaic monitor mode. If the function key 78 is pressed (Yes at step S93), the program flow goes back to step S51, and then, the mosaic monitor images are printed on a piece of copying paper. On the other hand, if the function key 78 is not pressed (No at step S93), the program flow goes to step S101.

At step S101, it is judged whether or not the print start key 71 is pressed in order to request the copying operation. If the print start key 71 is pressed (Yes at step S101), a document set on the document table is scanned, and the copying operation is started at step S102 under the condition of the selected color adjustment coefficients $y_1$, $m_1$ and $c_1$. Thereafter, the copying operation has been performed until it is completed (Yes at step S103).

Thereafter, when the copying operation is completed (Yes at step S103), the selected color adjustment coefficients $y_1$, $m_1$ and $c_1$ which have been used upon the copying operation of steps S102 to S103 are stored as the standard coefficients in the RAM 25R at step S111, and then, the program flow returns. It is to be noted that the standard coefficients $y_1$, $m_1$ and $c_1$ becomes the initial values in the next mosaic monitor mode.

(5-4) Interruption process for setting Color adjustment coefficients

FIGS. 13a and 13b are flowcharts of an interruption process for setting the color adjustment coefficients for making the color adjustment upon printing the mosaic monitor images. This interruption process is performed when the horizontal synchronizing signal Hsync is input to the CPU 25 so that the operation of the CPU 25 is interrupted.

In the interruption process, a counter $Ct_1$ counts a distance in the subscan direction Y from the edge of the image formed on a copying paper P shown in FIG. 6 so as to detect the print start point $P_0$ and the print end point $P_1$ of the mosaic monitor images GM. A counter $Ct_2$ counts a distance in the subscan direction Y so as to detect respective blocks of the mosaic monitor images GM. In FIG. 6, T denotes a distance in the subscan direction Y between the edge of the image and the print start point of the mosaic monitor images GM, and l denotes a distance in the subscan direction Y of one block of the mosaic monitor images GM.

Referring to FIG. 13a, first of all, the program flow goes to either steps S301, S311, S341, S351 or S361 according to a state number at step S300. It is to be noted that the state number is set at "0" at the beginning of the print operation of the mosaic monitor images GM.

If the state number is "0" at step S300, it is judged whether or not the scanning point of the document has passed through the edge of the image formed on a piece of copying paper P at step S301. When the scanning point has passed through the edge of the image (Yes at step S301), the counting value of the counter $Ct_1$ is initialized at step S302, and the state number is set at "1" at step S303. Thereafter, the program flow goes to step S371. On the other hand, when the scanning point has not passed through the edge of the image (No at step S301), the program flow goes to step S371, directly.

If the state number is "1" at step S300, it is judged whether or not the counting value of the counter $Ct_1$ is equal to a value T at step S311, i.e., the scanning point reaches the position of the coordinate $y_1$ which is the edge of the mosaic monitor images GM. When the counting value of the counter $Ct_1$ is equal to the value T (Yes at step S311), the program flow goes to either one of steps S313, S322 or S331 according to the color of toner supplied by the development units 45a to 45c. That is, when the color of toner is yellow (Yes at step S312), the state number is set at "2" at step S313. When the color of toner is magenta (Yes at step S321), the counting value of the counter $Ct_2$ is initialized at step S322, the variable i is set at "0" at step S323, and then, the state number is set at "3" at step S324. On the other hand, when the counting value of the counter $Ct_1$ is not equal to the value T (No at step S311), the program flow goes to step S371, directly. When the color of toner is cyan (No at step S321), the counting value of the counter $Ct_2$ is initialized at step S331, the variable j is set at "0" at step S332, and the state number is set at "4" at step S333.

If the state number is "2" at step S300, a latch signal is outputted to the color tone setting circuit 2 at step S341 of FIG. 13b so that the values $y_0$, $y_1$ and $y_2$ are latched as the coefficients 1 to 3 at the latches 302, 303 and 304, respectively, and thereafter, it is judged whether or not the counting value of the counter $Ct_1$ is equal to a value $(T+9l)$ at step S342, i.e., the scanning point reaches the position of the coordinate $y_1$ which is the last edge of the mosaic monitor images GM. When the counting value of the counter $Ct_1$ is equal to the value $(T+9l)$ (Yes at step S342), the state number is set at "0" at step S343, and then, the program flow goes to step S371. On the other hand, when the counting value of the counter $Ct_1$ is not equal to the value $(T+9l)$ (No at step S342), the program flow goes to step S371, directly.

If the state number is "3" at step 300, the value $m_i$ is set as the coefficients 1 to 3 at the latches 302 to 304 at step S351, and it is judged whether or not the counting value of the counter $Ct_2$ is equal to the value 1, i.e., the scanning point has passed through one block of the mosaic monitor images GM at step S352. If the counting value of the counter $Ct_2$ is equal to the value 1 (Yes at step S352), the counting value of the counter $Ct_2$ is initialized at step S353, and the variable i is increased by one at step S354. Thereafter, the program flow goes to step S355. On the other hand, if the counting value of the counter $Ct_2$ is not equal to the value 1 (No at step S352), the program flow goes to step S355, directly. At step S355, it is judged whether or not the counting value of the counter $Ct_1$ is equal to the value $(T+91)$, i.e., the scanning point reaches the last edge of the mosaic monitor images GM. If the counting value of the counter $Ct_1$ is equal to the value $(T+91)$ (Yes at step S355), the state number is set at "0" at step S356, and the program flow goes to step S371. On the other hand, if the counting value of the counter $Ct_1$ is not equal to the value $(T+91)$ (No at step S355), the program flow goes to step S371, directly. That is, in the process of the state number "3", the same value $m_i$ is set at the coefficients 1 to 3, and also the coefficients 1 to 3 are altered to the new value $m_{i+1}$ every time the scanning point reaches the next block of image of the mosaic monitor image in the subscan direction Y.

If the state number is "4" at step 300, the value $c_j$ is set as the coefficients 1 to 3 at the latches 302 to 304 at step 361, it is judged whether or not the counting value of the counter $Ct_2$ is equal to a value (31), i.e., the scanning point has passed through three blocks of images of the mosaic monitor monitor image at step S362. If the counting value of the counter $Ct_2$ is equal to the value (31) (Yes at step S362), the counter $Ct_2$ is initialized at step S363, and the variable j is increased by one at step S364, and thereafter, the program flow goes to step S365. On the other hand, if the counting value of the counter $Ct_2$ is not equal to the value (31) (No at step S362), the program flow goes to step S365, directly.

At step S365, it is judged whether or not the counting value of the counter $Ct_1$ is equal to the value $(T+91)$, i.e., the scanning point reaches the last edge of the mosaic monitor image at step S365. If the counting value of the counter $Ct_1$ is equal to the value $(T+91)$ (Yes at step S365), the state number is set at "0" at step S366, and then, the program flow goes to step S371. On the other hand, if the counting value of the counter $Ct_1$ is not equal to the value $(T+91)$ (No at step S365), the program flow goes to step S371, directly. In the above process of the state number "4", the same value $c_j$ is set as the coefficients 1 to 3 at the latches 302 to 304, and the coefficients 1 to 3 are altered to the new value $c_{j+1}$ every time the scanning point passes through three blocks of images of the mosaic monitor image in the subscan direction Y.

After respective above processes of the state numbers "1" to "4", respective counting values of the counters $Ct_1$ and $Ct_2$ are increased by one at step S371, and then, the program flow returns. When the above processes are completed, various coefficients are set at respective blocks of images corresponding to respective printing colors so that the color adjustment has been made for the mosaic monitor image.

Second preferred embodiment

Figure 16:
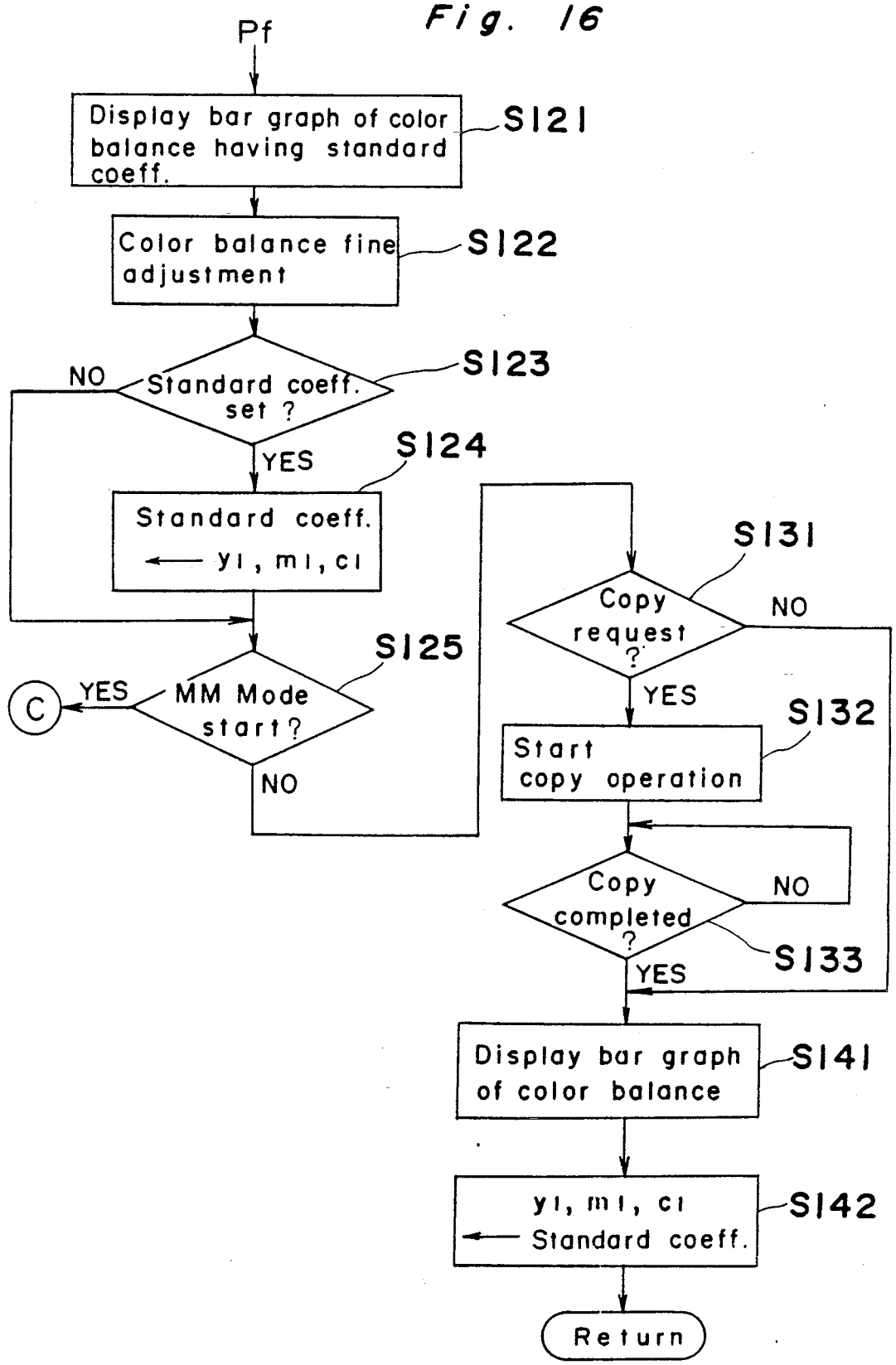
FIG. 16 is a partial flowchart showing a mosaic monitor image printing process of the second preferred embodiment.

FIG. 16 is a partial flowchart showing a mosaic monitor image printing process of a second preferred embodiment according to the present invention which is provided in place of steps S91 to S111 of FIG. 11b of the first preferred embodiment. In the second preferred embodiment, the composition of the digital color copying machine and the other flowcharts thereof are similar to those of the first preferred embodiment.

The digital color copying machine of the second preferred embodiment is characterized in that the color balance or the color adjustment coefficients can be fine adjusted in eleven steps using a fine adjustment constant $b_0$ which is defined as a difference between the adjacent color adjustment coefficients of each color. In the present preferred embodiment, it is set that $a_0 = 3 \times b_0$, and the standard coefficients $y_1$, $m_1$ and $c_1$ set in the mosaic monitor mode coincide with the center values between the adjacent color adjustment coefficients of each color upon the color balance fine adjustment. As a result, it can be easily understood that the color adjustment coefficients set in the mosaic monitor mode coincide with the color adjustment coefficients set in the color balance fine adjustment.

Figure 14:
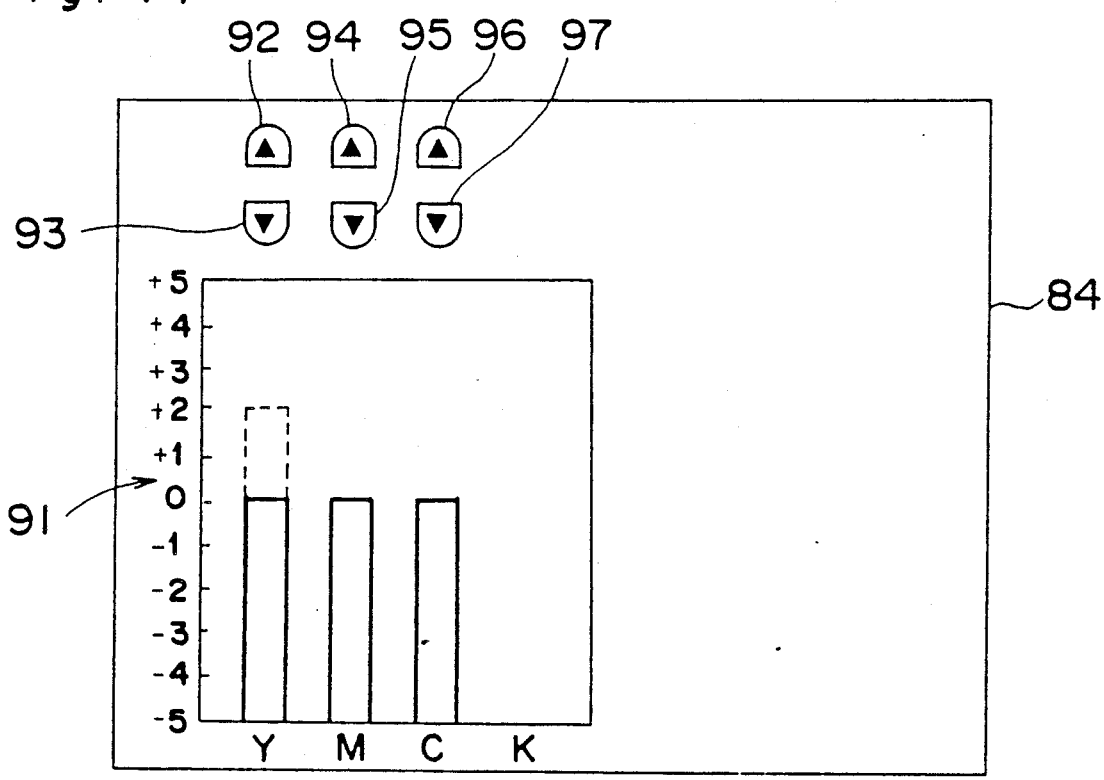
FIG. 14 is a front view showing a bar graph displayed on the display section of the operation panel shown in FIG. 4 upon making a color fine adjustment of a second preferred embodiment according to the present invention.

In the second preferred embodiment, after the mosaic monitor images are printed on a piece of copying paper in the mosaic monitor mode at step S53 of FIG. 11a and a desirable image is selected among the mosaic monitor images at step S61 of FIG. 11a, there are displayed a bar graph 91 for indicating respective color adjustment levels of yellow color (Y), magenta color (M) and cyan color (C) and keys 92 to 97 on the display section 84 of the operation panel 70 as shown in FIG. 14 in order to display a result of the color balance fine adjustment made for a desirable image of the mosaic monitor images, and then, the operator can make the color balance fine adjustment at step S122 of FIG. 16.

In the bar graph 91 of FIG. 14, respective color adjustment levels are represented in eleven steps in the range from $+5$ to $-5$ using the above fine adjustment constant $b_0$. As shown in FIG. 14, there are provided up keys 92, 94 and 96 for respectively increasing the color adjustment levels of respective colors Y, M and C by one step corresponding to the above fine adjustment constant $b_0 = a_0/3$, and also down keys 93, 95 and 97 for respectively decreasing the color adjustment levels of respective colors Y, M and C by one step corresponding to the above fine adjustment constant $b_0$.

The operation of the above fine adjustment is as follows.

After the cursor is moved into a position of one of the keys 92 to 97 by operating the jog dials 82 and 83, the set key 76 is pressed once, the color adjustment level corresponding to the pressed key changes by one step, and the length of one bar in the bar graph 91 shown in FIG. 14 correspondingly increases or decreases. When the above operation is repeated, the color adjustment level increases or decreases one by one by one step.

Figure 15:
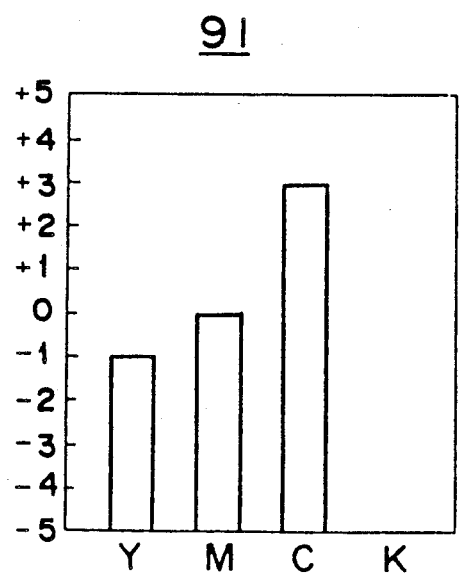
FIG. 15 is a front view showing another bar graph displayed on the display section of the operation panel shown in FIG. 4 upon making the color fine adjustment of the second preferred embodiment.

If the cursor is set at the up key 92 for increasing the color adjustment level of yellow color by one step and the set key 76 is pressed twice, the length of the bar representing the color adjustment level changes as indicated by a dotted line in FIG. 14. In the case that the color adjustment coefficients of the selected desirable image are $y_0 = y_1 - a_0$, $m_1$ and $c_2 = c_1 + a_0$, the bar graph is shown in FIG. 15, since it is set that the adjustment constant $a_0 = 3 \times b_0$.

Thereafter, when the color adjustment levels set thus are set as the standard coefficients $y_1$, $m_1$ and $c_1$ at step S124 of FIG. 16, the standard coefficients $y_1$, $m_1$ and $c_1$ to be set in the mosaic monitor mode can be finely adjusted in a step of the fine adjustment constant $b_0 = a_0/3$ in place of the adjustment constant $a_0$ in the first preferred embodiment. Thereafter, when the mosaic monitor mode is started again (Yes at step S125), the color adjustment coefficients $y_i$, $m_i$ and $c_i$ (i=0, 2) are calculated at step S52 of FIG. 11a using the above equations (1) to (6) from the set standard coefficients $y_1$, $m_1$ and $c_1$, and then, the mosaic monitor images are printed on a piece of copying paper at step S53 of FIG. 11a.

Referring to FIG. 16 showing a partial portion of the mosaic monitor image printing process, an action of the second preferred embodiment following the program flow point Pf will be described in detail below.

As shown in FIG. 14, the color adjustment coefficients $y_1$, $m_1$ and $c_1$ which have been set at steps 62 to S84 of FIGS. 11a and 11b are displayed as "zero" level on the display section 84 of the operation panel 70 at step S121 in order to clearly display the next fine adjustment amounts. Then, if, for example, the color adjustment coefficients corresponding to the selected image at step S61 of FIG. 11a are $y_0$, $m_1$, $c_2$, respectively, respective color adjustment levels of the scale "zero" of the bar graph 91 corresponds to $y_0$ for yellow color, $m_1$ for magenta color, and $c_2$ for cyan color.

Thereafter, the operator makes the color balance adjustment at step S122, wherein the fine adjustment constant $b_0$ of one step in the fine adjustment is equal to $a_0/3$. For example, if the operator wishes to increase the color adjustment coefficient of yellow color by two steps, the cursor displayed on the display section 84 is moved into a position of the up key 85 for increasing the color adjustment coefficient of yellow color by operating the jog dials 82 and 83, and the set keys 76 are pressed twice. Then, the display of the bar graph 91 is altered as indicated by a dotted line in FIG. 14. Since the operator can watch the printed mosaic monitor images and the bar graph 91 displayed on the display section 84, he can make the color balance fine adjustment more easily.

Thereafter, it is judged whether or not the operator wishes to set the selected color adjustment coefficients as the standard coefficients $y_1$, $m_1$ and $c_1$, respectively, at step S123. Then, a message "Is the selected color balance as standard values?" is displayed on the display section 84 of the operation panel 70, as shown in FIG. 12. Responsive to this, the operator enters an answer "Yes" or "No" for the message using the jog dials 82 and 83 and the set key 76. If the operator wishes to set them as the standard coefficients $y_1$, $m_1$ and $c_1$, respectively (Yes at step S123), the color adjustment coefficients which have been selected at steps S62 to S84 are stored as the standard coefficients $y_1$, $m_1$ and $c_1$, respectively, in the RAM 25R at step S124. In the case of the above example, the standard coefficients $y_1$, $m_1$ and $c_1$ are set at $y_1 - a_0/3$, $m_1$, and $c_1 + a_0$, respectively. Thereafter, the program flow goes to step S125.

On the other hand, if the operator does not wish to set the selected color adjustment coefficients as the standard coefficients $y_1$, $m_1$ and $c_1$ (No at step S123), the program flow goes to step S125, directly.

Thereafter, it is judged whether or not the mosaic monitor mode is started at step S125. For example, when the operator wishes to print the mosaic monitor images under the condition of the standard coefficients $y_1$, $m_1$ and $c_1$ which have been newly set on a piece of printing paper, he presses the function key 78 in order to start the mosaic monitor. If the function key 78 is pressed (Yes at step S125), the program flow goes back to step S51 of FIG. 11a, and then, the mosaic monitor images are printed on a piece of copying paper, wherein the mosaic monitor images are composed of respective 27 images having the fine adjusted standard coefficients and respective color adjustment coefficients increased and decreased by the above adjustment constant $a_0$. On the other hand, if the function key 78 is not pressed (No at step S125), the program flow goes to step S131.

At step S131, it is judged whether or not the print start key 71 is pressed in order to request the copying operation. If the print start key 71 is pressed (Yes at step S131), a document set on the document table is scanned, and the copying operation is started under the condition of the selected color adjustment coefficients $y_1$, $m_1$ and $c_1$ at step S132. Thereafter, the copying operation has been performed until it is completed (Yes at step S133).

Thereafter, when the copying operation is completed (Yes at step S133), the bar graph 91 having the color adjustment coefficients of the color balance used in the copying operation is displayed on the display section 84 as shown in FIG. 15 at step S141. Thereafter, the selected color adjustment coefficients $y_1$, $m_1$ and $c_1$ which have been used upon the copying operation of steps S132 and S133 are stored as the standard coefficients in the RAM 25R at step S142, and then, the program flow returns. It is to be noted that the standard coefficients $y_1$, $m_1$ and $c_1$ become the initial values in the next mosaic monitor mode.

Third preferred embodiment

Figure 17:
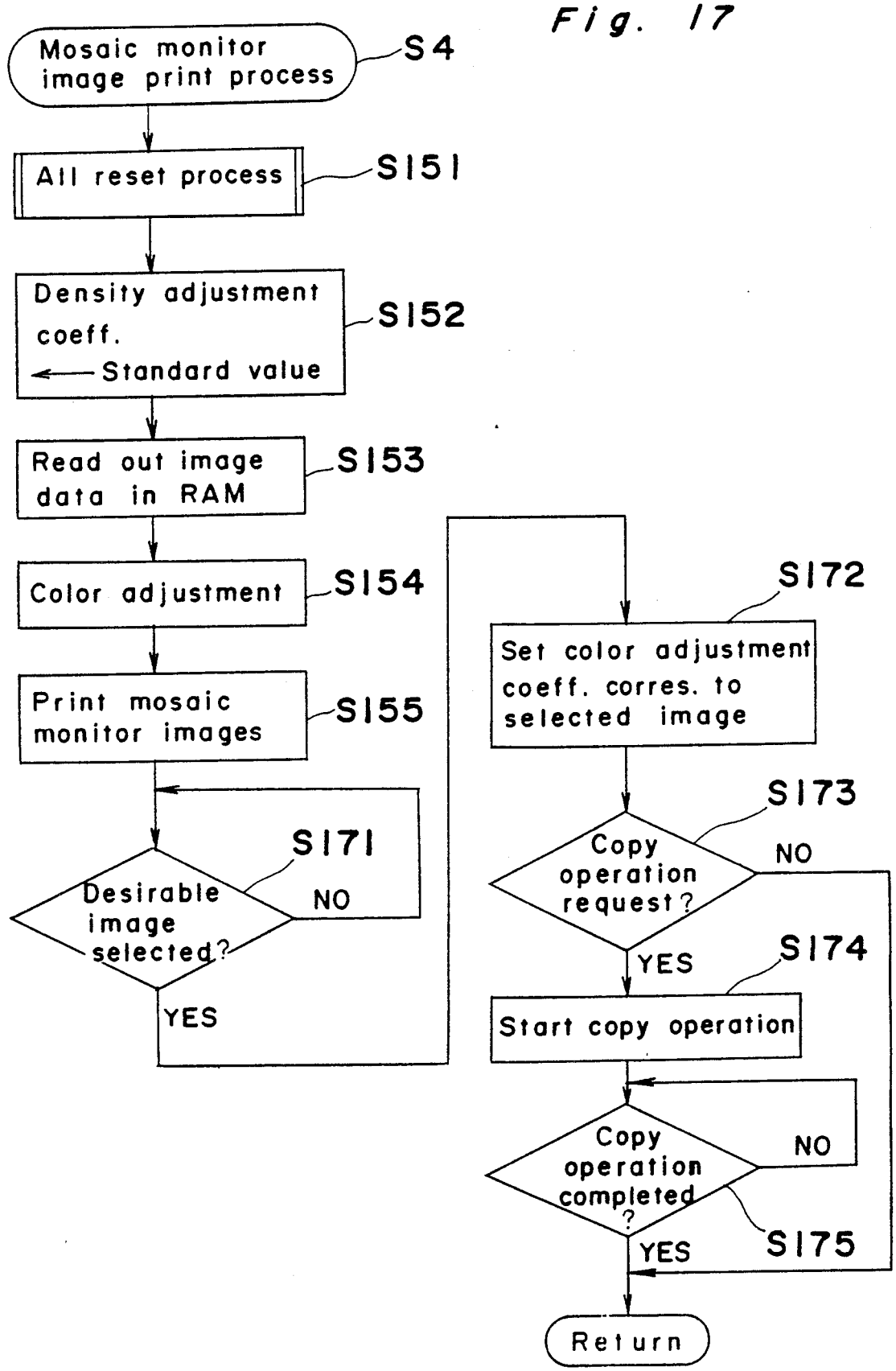
FIG. 17 is a flowchart showing a mosaic monitor image printing process of a third preferred embodiment according to the present invention.

FIG. 17 is a flowchart showing a mosaic monitor image printing process of a third preferred embodiment according to the present invention which is provided in place of the mosaic monitor image printing process shown in FIGS. 11a and 11b of the first preferred embodiment. In the third preferred embodiment, the composition of the digital color copying machine and the other flowcharts thereof are similar to those of the first preferred embodiment.

The digital color copying machine of the third preferred embodiment is characterized in that the mosaic monitor image printing process includes a process for automatically setting proper printing conditions, namely, the printing conditions for printing the mosaic monitor image are automatically set at predetermined initial conditions suitable for the printing operation in the mosaic monitor mode in order to prevent any wrong printing condition from being set such that the printing operation can not be performed properly.

Figure 18:
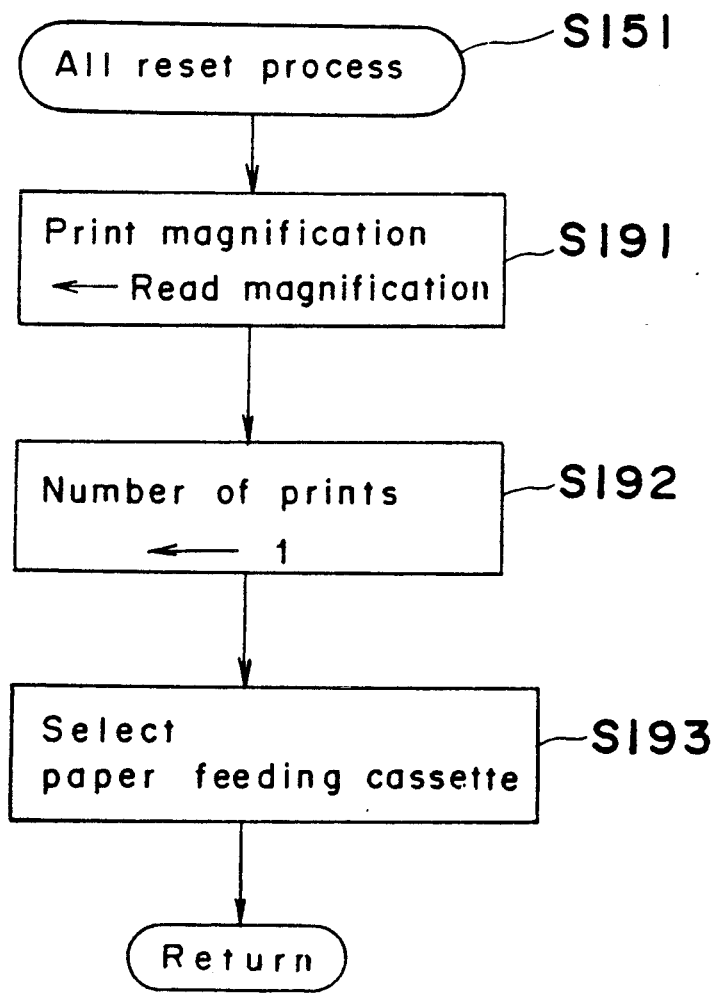
FIG. 18 is a flow chart showing an all reset process of a subroutine shown in FIG. 17.

Referring to FIG. 17, first of all, an all reset process of a subroutine is executed at step S151. Namely, as shown in FIG. 18, the printing magnification upon printing an image on a piece of copying paper is set so as to be equal to the reading magnification upon reading a document image, namely, the so-called equal magnification is set at step S191, and then, the number of prints is set at one at step S192. Thereafter, at step S193, there is selected one of the paper feeding cassettes 50 on which there are set copying papers having a size on which the above mosaic monitor image can be printed. The program flow returns to the mosaic monitor image printing process of FIG. 17.

Referring back to FIG. 17, the density adjustment coefficient is set at a predetermined standard value at step S152. Namely, if the density adjustment coefficient has been altered prior to the mosaic monitor, the density adjustment coefficient is automatically reset to the predetermined standard value. Since the density adjustment coefficient is always reset to the predetermined standard value prior to the mosaic monitor mode, any wrong color adjustment is prevented from being made in the mosaic monitor mode.

Thereafter, the image data of a specified area EA stored in the RAM 401 are read out at step S153, and then, color adjustment coefficients $y_i$, $m_i$ and $c_i$ ($i=0, 1, 2$) are outputted to the color tone setting circuit 2 so as to make a color adjustment at step S154. Thereafter, the mosaic monitor images are printed on a piece of printing paper at step S155.

Thereafter, if the operator selects a desirable image among the mosaic monitor images using the display section 84 (Yes at step S171), there are set the color adjustment coefficients Ky, Km and Kc corresponding to the selected image at step S172.

At step S173, it is judged whether or not the print start key 71 is pressed in order to request the copying operation. If the print start key 71 is pressed (Yes at step S173), a document set on the document table 15 is scanned, and the copying operation is started at step S174 under the condition of the selected color adjustment coefficients $y_i$, $m_i$ and $c_i$. Thereafter, the copying operation has been performed until it is completed (Yes at step S175). Thereafter, when the copying operation is completed (Yes at step S175), the program flow returns to the main routine shown in FIG. 9.

Modifications

At step S111 of the first preferred embodiment and step S142 of the second preferred embodiment, the selected color adjustment coefficients $y_1$, $m_1$ and $c_1$ which have been used upon the copying operation of steps S102 to S103 or steps S132 to S133 are stored as the standard coefficients in the RAM 25R at step S111 or S142, respectively. However, the present invention is not limited to this. It may be selected using a function key by the operator whether or not the selected color adjustment coefficients are to be stored as the standard coefficients in the RAM 25R.

At step S52 of the first preferred embodiment, the color adjustment coefficients $y_i$, $m_i$ and $c_i$ ($i=0, 2$) are calculated. At that time, if the calculated color adjustment coefficients are larger than a maximum adjustment coefficient or smaller than a minimum adjustment coefficient which are in the range of the color adjustment, the above maximum or minimum adjustment coefficient may be set as the color adjustment coefficients, respectively.

In the second preferred embodiment, it is set that the adjustment constant $a_0$ is equal to three times the fine adjustment constant $b_0$. However, the present invention is not limited to this, and any relationship between the adjustment constants $a_0$ and $b_0$ may be set so that the adjustment constant $a_0$ is larger than the fine adjustment constant $b_0$.

In the second preferred embodiment, the color adjustment coefficients set in the fine adjustment mode are altered in steps. However, the present invention is not limited to this. The color adjustment coefficients may be altered continuously. Furthermore, it is always unnecessary to make the color adjustment coefficients set in the fine adjustment mode coincide with the color adjustment coefficients set in the mosaic monitor mode.

At step S193 of the third preferred embodiment, there is selected one of the paper feeding cassettes 50 on which there are set copying papers having a size on which the above mosaic monitor image can be printed. However, the present invention is not limited to this. There may be selected the paper feeding cassette 50 for accommodating copying papers having a maximum size at step S193.

In the mosaic monitor image printing process of the third preferred embodiment, if the operator enters a setting value of the printing conditions such as alteration of the number of prints at a timing between steps S155 and S171, the printing conditions may be set according to printing conditions entered by the operator.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An image forming apparatus comprising:
image data supply means for supplying reference color image data;
adjustment coefficient supply means for supplying plural different color adjustment coefficients;
processing means for transforming said reference color image data into plural sample image data having color tones stepwise different from each other by multiplying said reference color image data one by one by said plural color adjustment coefficients;
recording means for recording plural sample images corresponding to said plural sample image data on a piece of recording paper;
selection means for selecting one of said plural sample images; and
control means for altering said reference color image data supplied by said image data supply means into another reference color image data responsive to color adjustment coefficients of one of said plural sample images selected by said selection means.

2. The apparatus as claimed in claim 1,
wherein said image data supply means comprises:
image reading means for optically reading a document image of a document set on a document table and transforming said document image into an electric signal, and
image data generation means for generating said reference color image data by executing a predetermined process for said electric signal; and
said control means controls said image data generation means so as to generate said reference color image data corresponding to said color adjustment coefficients of one of said plural sample images selected by said selection means.

3. The apparatus as claimed in claim 1,
wherein said processing said means transforms said reference color image data into plural sample image data having color tones stepwisely different from each other by multiplying said reference color image data one by one by said plural color adjustment coefficients.

4. An image forming apparatus comprising:
specifying means for specifying a partial area of a document image;

image data supply means for supplying reference color image data of said partial area specified by said specifying means;

adjustment coefficient supply means for supplying plural different color adjustment coefficients;

processing means for transforming said reference color image data into plural sample image data having color tones stepwise different from each other by multiplying said reference color image data one by one by said plural color adjustment coefficients;

recording means for recording plural sample images corresponding to said plural sample image data on a piece of recording paper;

selection means for selecting one of said plural sample images; and control means for altering said reference color image data supplied by said image data supply means into another reference color image data responsive to color adjustment coefficients of one of said plural sample images selected by said selection means.

5. The apparatus as claimed in claim 4, wherein said image data supply means comprises:

image reading means for optically reading a document image of a document set on a document table and transforming said document image into an electric signal, and image data generation means for generating said reference color image data by executing a predetermined process for said electric signal; and said control means controls said image data generation means so as to generate said reference color image data corresponding to said color adjustment coefficients of one of said plural sample images selected by said selection means.

6. An image forming apparatus comprising:

image data supply means for supplying color image data;

adjustment coefficient supply means for supplying plural different color adjustment coefficients;

processing means for transforming said color image data into plural sample image data having color tones stepwise different from each other by multiplying said color image data one by one by said plural color adjustment coefficients;

recording means for recording plural sample images corresponding to said plural sample image data on a piece of recording paper;

selection means for selecting one of said plural sample images; and control means for altering said color adjustment coefficients supplied by said adjustment coefficient supply means into another color adjustment coefficients responsive to one of said plural sample images selected by said selection means.

7. An image forming apparatus comprising:

image data supply means for supplying reference color image data having a predetermined color balance;

processing means for transforming said reference color image data into plural sample image data having color balances different from each other;

recording means for recording plural sample images corresponding to said plural sample image data on a piece of recording paper;

selection means for selecting desirable one of said plural sample images; and control means for controlling said image data supply means so that a color balance of said reference color image data becomes a color balance of one of said plural sample images selected by said selection means.

8. An image forming apparatus comprising:

image data supply means for supplying reference color image data having a predetermined color balance;

processing means for transforming said reference color image data into plural sample image data having color balances different from each other by altering a color balance of said reference color image data according to a predetermined rule;

recording means for recording plural sample images corresponding to said plural sample image data on a piece of recording paper;

selection means for selecting desirable one of said plural sample images; and control means for altering said predetermined rule into another rule responsive to one of said plural sample images selected by said selection means.

9. An image forming apparatus comprising:

image data supply means for supplying reference color image data;

adjustment coefficient supply means for supplying plural different color adjustment coefficients;

automatic processing means for transforming said reference color image data into plural sample image data having color tones stepwise different from each other by multiplying said reference color image data one by one by said plural color adjustment coefficients;

recording means for recording plural sample images corresponding to said plural sample image data on a piece of recording paper;

selection means for selecting one of said plural sample images;

manual processing means for fine adjusting said color adjustment coefficients of one of said plural sample images selected by said selection means by manual operation; and control means for altering said reference color image data supplied by said image data supply means into another reference color image data responsive to said color adjustment coefficients fine adjusted by said manual processing means.

10. The apparatus as claimed in claim 9, wherein said image data supply mans comprises:

image reading means for optically reading a document image of a document set on a document table and transforming said document image into an electric signal, and image data generation means for generating said reference color image data by executing a predetermined process for said electric signal; and said control means controls said image data generation means so as to generate said reference color image data corresponding to said color adjustment coefficients of one of said plural sample images selected by said selection means.

11. The apparatus as claimed in claim 9, wherein said processing means transforms said reference color image data into plural sample image data having color tones stepwise different from each other by multiplying said reference color image data one by one said plural color adjustment coefficients.

12. The apparatus as claimed in claim 9, further comprising a display means for displaying said color adjustment coefficients fine adjusted by said manual processing means.

13. An image forming apparatus comprising:
specifying means for specifying a partial area of a document image;
image data supply means for supplying reference color image data of said partial area specified by said specifying means;
adjustment coefficient supply means for supplying plural different color adjustment coefficients;
automatic processing means for transforming said reference color image data into plural sample image data having color tones stepwisely different from each other by multiplying said reference color image data one by one by said plural color adjustment coefficients;
recording means for recording plural sample images corresponding to said plural sample image data on a piece of recording paper;
selection means for selecting one of said plural sample images;
manual processing means for fine adjusting said color adjustment coefficients of one of said plural sample images selected by said selection means by manual operation; and
control means for altering said reference color image data supplied by said image data supply means into another reference color image data responsive to said color adjustment coefficients fine adjusted by said manual processing means.

14. An image forming apparatus comprising:
image forming means for forming an image on a piece of recording paper under one of plural selectable image forming conditions, said image forming means being operable in a document image recording mode for forming a document image on a piece of recording paper, and a sample image recording mode for forming a sample image on a piece of recording paper;
first selection means for selecting desirable one of said plural image forming conditions;
second selection means for selecting either said document image recording mode or said sample image recording mode; and
control means for enabling said image forming means under a predetermined image forming condition independent of one of said plural image forming conditions selected by said first selection means when said sample image recording mode is selected by said second selection means.

15. The apparatus as claimed in claim 14,
wherein said predetermined image forming condition is a number of recording papers onto which an image is to be formed.

16. The apparatus as claimed in claim 14,
wherein said predetermined image forming condition is a density of an image to be recorded on a piece of recording paper.

17. The apparatus as claimed in claim 14,
wherein said predetermined image forming condition is a kind of said recording paper.

18. The apparatus as claimed in claim 14,
wherein said predetermined image forming condition is a recording magnification upon recording an image on a piece of recording paper.

19. An image forming apparatus comprising:
image reading means for reading a document image;
image forming means for forming an image on a piece of recording paper under one of plural selectable image forming conditions, said image forming means being operable in a document image recording mode for forming said document image read by said image reading means on a piece of recording paper, and a sample image recording mode for forming plural sample images having different color balances of either a partial area or the whole area of said document image read by said image reading means on a piece of recording paper;
first selection means for selecting desirable one of said plural image forming conditions;
second selection means for selecting either said document image recording mode or said sample image recording mode; and
control means for enabling said image forming means under a predetermined image forming condition independent of one of said plural image forming conditions selected by said first selection means when said sample image recording mode is selected by said second selection means.

20. The apparatus as claimed in claim 19,
wherein said predetermined image forming condition is a number of recording papers onto which an image is to be formed.

21. The apparatus as claimed in claim 19,
wherein said predetermined image forming condition is a density of an image to be recorded on a piece of recording paper.

22. The apparatus as claimed in claim 19,
wherein said predetermined image forming condition is a kind of said recording paper.

23. The apparatus as claimed in claim 19,
wherein said predetermined image forming condition is a recording magnification upon recording an image on a piece of recording paper.

24. In an image forming apparatus for forming sample images on a piece of recording paper,
an image forming method including steps of:
supplying reference color image data;
supplying plural different color adjustment coefficients;
transforming said reference color image data into plural sample image data having color tones stepwisely different from each other by multiplying said reference color image data one by one by said plural color adjustment coefficients;
recording plural sample images corresponding to said plural sample image data on a piece of recording paper;
selecting one of said plural sample images; and
altering said supplied reference color image data into another reference color image data responsive to color adjustment coefficients of said selected one of said plural sample images.

25. In an image forming apparatus for forming sample images on a piece of recording paper,
an image forming method including steps of:
specifying a partial area of a document image;
supplying reference color image data of said specified partial area;
supplying plural different color adjustment coefficients;
transforming said reference color image data into plural sample image data having color tones stepwisely different from each other by multiplying said reference color image data one by one by said plural color adjustment coefficients;

recording plural sample images corresponding to said plural sample image data on a piece of recording paper;

selecting one of said plural sample images; and altering said supplied reference color image data into another reference color image data responsive to color adjustment coefficients of said selected one of said plural sample images.

26. In an image forming apparatus for forming sample images on a piece of recording paper, an image forming method including steps of:

supplying color image data;

supplying plural different color adjustment coefficients;

transforming said color image data into plural sample image data having color tones stepwise different from each other by multiplying said color image data one by one by said plural color adjustment coefficients;

recording plural sample images corresponding to said plural sample image data on a piece of recording paper;

selecting one of said plural sample images; and altering said supplied color adjustment coefficients supplied into another color adjustment coefficients responsive to said selected one of said plural sample images.

27. In an image forming apparatus for forming sample images on a piece of recording paper, an image forming method including steps of:

supplying reference color image data having a predetermined color balance;

transforming said reference color image data into plural sample image data having color balances different from each other;

recording plural sample images corresponding to said plural sample image data on a piece of recording paper;

selecting desirable one of said plural sample images; and controlling so that a color balance of said reference color image data becomes a color balance of said selected one of said plural sample images.

28. In an image forming apparatus for forming sample images on a piece of recording paper, an image forming method including steps of:

supplying reference color image data having a predetermined color balance;

transforming said reference color image data into plural sample image data having color balances different from each other by altering a color balance of said reference color image data according to a predetermined rule;

recording plural sample images corresponding to said plural sample image data on a piece of recording paper;

selecting desirable one of said plural sample images; and altering said predetermined rule into another rule responsive to said selected one of said plural sample images.

29. In an image forming apparatus for forming sample images on a piece of recording paper, an image forming method including steps of:

supplying reference color image data;

supplying plural different color adjustment coefficients;

transforming said reference color image data into plural sample image data having color tones stepwise different from each other by multiplying said reference color image data one by one by said plural color adjustment coefficients;

recording plural sample images corresponding to said plural sample image data on a piece of recording paper;

selecting one of said plural sample images;

fine adjusting said color adjustment coefficients of said selected one of said plural sample images; and altering said supplied reference color image data into another reference color image data responsive to said fine adjusted color adjustment coefficients.

30. In an image forming apparatus for forming sample images on a piece of recording paper, an image forming method including steps of:

specifying a partial area of a document image;

supplying reference color image data of said specified partial area;

supplying plural different color adjustment coefficients;

transforming said reference color image data into plural sample image data having color tones stepwise different from each other by multiplying said reference color image data one by one by said plural color adjustment coefficients;

recording plural sample images corresponding to said plural sample image data on a piece of recording paper;

selecting one of said plural sample images;

fine adjusting said color adjustment coefficients of said selected one of said plural sample images; and altering said supplied reference color image data into another reference color image data responsive to said fine adjusted color adjustment coefficients.

31. In an image forming apparatus for forming an image on a piece of recording paper under one of plural selectable image forming conditions, said image forming apparatus being operable in a document image recording mode for forming a document image on a piece of recording paper, and a sample image recording mode for forming plural sample images having different color balances on a piece of recording paper;

an image forming method including steps of:

selecting said sample image recording mode;

setting a predetermined image forming condition when said sample image recording mode is selected; and forming said plural sample images on a piece of recording paper under said set predetermined image forming condition in said sample image recording mode.

32. The method as claimed in claim 31, wherein said predetermined image forming condition is a number of recording papers onto which an image is to be formed.

33. The method as claimed in claim 31, wherein said predetermined image forming condition is a density of an image to be recorded on a piece of recording paper.

34. The method as claimed in claim 31, wherein said predetermined image forming condition is a kind of said recording paper.

35. The method as claimed in claim 31, wherein said predetermined image forming condition is a recording magnification upon recording an image on a piece of recording paper.

* * * * *